(12) United States Patent
Tang et al.

(10) Patent No.: US 10,936,869 B2
(45) Date of Patent: *Mar. 2, 2021

(54) CAMERA CONFIGURATION ON MOVABLE OBJECTS

(71) Applicant: SZ DJI TECHNOLOGY CO., LTD., Shenzhen (CN)

(72) Inventors: Ketan Tang, Shenzhen (CN); Honghui Zhang, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,365

(22) Filed: Oct. 31, 2019

(65) Prior Publication Data

US 2020/0073411 A1 Mar. 5, 2020

Related U.S. Application Data

(63) Continuation of application No. 15/675,403, filed on Aug. 11, 2017, now Pat. No. 10,466,718, which is a (Continued)

(51) Int. Cl.
*G06K 9/00* (2006.01)
*B64C 39/02* (2006.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC .......... G05D 1/101; G05D 1/102; G01C 3/14; G01C 3/00; G06K 9/00805; G06K 9/0063;
(Continued)

(56) References Cited

U.S. PATENT DOCUMENTS 7,650,013 B2    1/2010  Dietsch et al.
8,467,902 B2    6/2013  Myeong et al.
(Continued)

FOREIGN PATENT DOCUMENTS

CN    101430207 A    5/2009
CN    102591353 A    7/2012
(Continued)

OTHER PUBLICATIONS

The World Intellectual Property Organization (WIPO) International Search Report and Written Opinion for PCT/CN2015/083517 dated Feb. 29, 2016.
(Continued)

*Primary Examiner* — Allen C Wong

(74) *Attorney, Agent, or Firm* — Anova Law Group, PLLC

(57) ABSTRACT

A method includes receiving a plurality of images from an imaging device carried by a movable object. The method further includes determining whether an environment type of the movable object is a first type or a second type according to sensing data received from one or more sensors of the movable object, identifying a target based on the plurality of images using a first method in response to determining that the environment type is the first type and using a second method different from the first method in response to determining that the environment type is the second type, and determining state information of the movable object or the target based on the plurality of images.

20 Claims, 13 Drawing Sheets

Related U.S. Application Data continuation of application No. 15/213,118, filed on Jul. 18, 2016, now Pat. No. 9,778,662, which is a continuation of application No. PCT/CN2015/083517, filed on Jul. 8, 2015.

(51) Int. Cl.

| | | |
|---|---|---|
| *B64D 47/08* | (2006.01) | |
| *H04N 5/247* | (2006.01) | |
| *G05D 1/10* | (2006.01) | |
| *G01C 3/14* | (2006.01) | |
| *G06T 7/73* | (2017.01) | |
| *G01C 3/00* | (2006.01) | |

(52) U.S. Cl.
CPC .............. *G01C 3/00* (2013.01); *G01C 3/14* (2013.01); *G05D 1/102* (2013.01); *G06K 9/00805* (2013.01); *G06T 7/73* (2017.01); *H04N 5/247* (2013.01); *B64C 2201/027* (2013.01); *B64C 2201/123* (2013.01); *B64C 2201/127* (2013.01); *G06T 2207/10004* (2013.01)

(58) Field of Classification Search
CPC . G06T 7/73; G06T 2207/10004; H04N 5/247; B64C 39/024; B64C 2201/027; B64C 2201/127; B64C 2201/123; B64D 47/08
USPC ........................................................ 348/117
See application file for complete search history.

(56) References Cited

U.S. PATENT DOCUMENTS

| | | | |
|---|---|---|---|
| 8,498,447 | B2 | 7/2013 | Derbanne |
| 8,543,265 | B2 | 9/2013 | Ekhaguere et al. |
| 8,687,062 | B1 | 4/2014 | Reece |
| 8,849,483 | B2 | 9/2014 | Kuwata et al. |
| 8,996,207 | B2 | 3/2015 | Goossen et al. |
| 9,613,539 | B1* | 4/2017 | Lindskog ................ G08G 5/04 |
| 2003/0152892 | A1 | 8/2003 | Huang et al. |
| 2008/0243383 | A1 | 10/2008 | Lin |
| 2009/0125223 | A1 | 5/2009 | Higgins |
| 2011/0204188 | A1 | 8/2011 | Marcus |
| 2011/0264305 | A1 | 10/2011 | Choe et al. |
| 2013/0051673 | A1* | 2/2013 | Wernersson ............. G06T 7/11 382/173 |
| 2013/0193269 | A1 | 8/2013 | Zwaan et al. |
| 2014/0047932 | A1 | 2/2014 | Coote et al. |
| 2014/0163781 | A1* | 6/2014 | Vian ...................... G01S 17/88 701/3 |
| 2016/0129999 | A1 | 5/2016 | Mays |
| 2016/0244187 | A1 | 8/2016 | Byers et al. |
| 2017/0041545 | A1* | 2/2017 | Murgia ................ H04N 5/2329 |

FOREIGN PATENT DOCUMENTS

| | | | |
|---|---|---|---|
| CN | 102707724 | A | 10/2012 |
| CN | 103149939 | A | 6/2013 |
| CN | 103365297 | A | 10/2013 |
| CN | 103914065 | A | 7/2014 |
| CN | 104062977 | A | 9/2014 |
| EP | 1901153 | A1 | 3/2008 |
| GB | 2502932 | A | 12/2013 |
| JP | H07213753 | A | 8/1995 |
| JP | 2007240506 | A | 9/2007 |
| JP | 4889360 | B2 | 11/2007 |
| JP | 2010079697 | A | 4/2010 |
| JP | 4905829 | B2 | 3/2012 |
| JP | 2012140101 | A | 7/2012 |
| JP | 2014122019 | A | 7/2014 |
| WO | 2007141795 | A1 | 12/2007 |
| WO | 2015085483 | A1 | 6/2015 |

OTHER PUBLICATIONS

Nayak, et al. Vision Based Collision Avoidance System for UAVs: submitted to Robotics Vision Capstone, Prof K Dana. 2013. http://www.ece.rutgers.edu/~kdana/Capstone2013/capstone2013/uavreport.pdf.

UAS Vision. SenseFly's eXom Uses Vision & Ultrasound for Precision Flight. Nov. 11, 2014. http://www.uasvision.com/2014/11/11/senseflys-exom-uses-vision-ultrasound-for-precision-flight/.

* cited by examiner

CAMERA CONFIGURATION ON MOVABLE OBJECTS

CROSS-REFERENCE TO RELATED APPLICATIONS

This application is a continuation of application Ser. No. 15/675,403, filed Aug. 11, 2017, which is a continuation of application Ser. No. 15/213,118, filed Jul. 18, 2016, now U.S. Pat. No. 9,778,662, which is a continuation of International Application No. PCT/CN2015/083517, filed Jul. 8, 2015, the entire contents of all of which are incorporated herein by reference.

BACKGROUND

Movable objects such as unmanned aerial vehicles (UAVs) can be used for performing surveillance, reconnaissance, and exploration tasks in a wide variety of environments for military and civilian applications. A UAV may be manually controlled by a remote user, or may operate in a semi-autonomous or fully autonomous manner. Such UAVs can include sensors configured to collect data from the surrounding environment and processors to process the data for use in various applications (e.g., navigation).

Sensors may be arranged on the movable objects in a variety of configurations. Existing approaches for the arrangement of sensors on movable objects may be less than optimal in some instances. For example, information that is acquired by the sensors may be limited by their placement relative to the movable object. The utility of a sensor may be limited by the arrangement of the sensor on the movable objects.

SUMMARY

Embodiments disclosed herein provide systems and methods for obstacle detection and state information determination. In many embodiments, imaging devices may be arranged on a movable object so as to have a field of view oriented vertically relative to the movable object. Image data obtained using the imaging devices may be processed by one or more processors for further use. Advantageously, the approaches described herein may provide improved obstacle detection, obstacle avoidance, navigation, and determination of state information for movable objects.

Thus in one aspect, a method of detecting obstacles using a movable object is provided. The method comprises: receiving image data of an obstacle from an imaging device carried by the movable object, wherein the imaging device is configured to have a field of view oriented upward or downward relative to the movable object; receiving attitude information for the movable object; and calculating, via one or more processors, a distance between the movable object and the obstacle based on the image data of the obstacle and the attitude information for the movable object.

In some embodiments, the movable object comprises a plurality of propulsion units configured to effect movement of the movable object. In some embodiments, the movable object is an unmanned aerial vehicle (UAV). In some embodiments, the plurality of propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the field of view of the imaging device is oriented upward relative to the movable object. In some embodiments, the method further comprises operating the movable object within an indoor environment, wherein the image data comprises images of a ceiling within the indoor environment. In some embodiments, the calculating step comprises differentiating between a portion of the image data depicting the ceiling and a portion of the image data depicting the obstacle. In some embodiments, within the indoor environment, the distance from the movable object to the obstacle is estimated based on an angle of view of the obstacle within the images. In some embodiments, the method further comprises operating the movable object within an outdoor environment, wherein the image data comprises images of the sky. In some embodiments, the calculating step comprises differentiating between a portion of the image data depicting the sky and a portion of the image data depicting the obstacle. In some embodiments, within the outdoor environment, the distance from the movable object to the obstacle is estimated based on an angle of view of the obstacle within the images. In some embodiments, the field of view of the imaging device is oriented downward relative to the movable object. In some embodiments, the movable object is operated within an indoor environment and the image data comprises images of a floor within the indoor environment. In some embodiments, the image data comprises images of the floor meeting a wall. In some embodiments, the distance from the movable object to the obstacle is estimated based on an angle of view of the obstacle within the images, wherein a negative angle value is applied in the estimation. In some embodiments, the attitude information is generated by an inertial measurement unit (IMU). In some embodiments, the attitude information comprises at least one of a roll angle, a pitch angle, or a yaw angle of the movable object. In some embodiments, the calculating step comprises determining a portion of the field of view of the imaging device that is occupied by the obstacle, based on the image data.

In another aspect, a system for detecting obstacles using movable object is provided. The system comprises: an imaging device carried by the movable object and configured to obtain image data of an obstacle, wherein the imaging device is configured to have a field of view oriented upward or downward relative to the movable object; and one or more processors individually or collectively configured to: receive the image data of the obstacle from the imaging device; receive attitude information for the movable object; and calculate a distance between the movable object and the obstacle based on the image data of the obstacle and the attitude information for the movable object.

In some embodiments, the movable object comprises a plurality of propulsion units configured to effect movement of the movable object. In some embodiments, the movable object is an unmanned aerial vehicle (UAV). In some embodiments, the plurality of propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the field of view of the imaging device is oriented upward relative to the movable object. In some embodiments, the movable object is operated within an indoor environment and the image data comprises images of a ceiling within the indoor environment. In some embodiments, the one or more processors are configured to differentiate between a portion of the image data depicting the ceiling and a portion of the image data depicting the obstacle. In some embodiments, within the indoor environment, the distance from the movable object to the obstacle is estimated based on an angle of view of the obstacle within the images. In some embodiments, the movable object is operated within an outdoor environment and the image data comprises images of the sky. In some embodiments, the one or more processors are individually or collectively configured to differentiate between a portion of the image data depicting the sky and a portion of the image data depicting the obstacle. In some embodiments, within the outdoor environment, the distance from the movable object to the obstacle is estimated based on an angle of view of the obstacle within the images. In some embodiments, the field of view of the imaging device is oriented downward relative to the movable object. In some embodiments, the movable object is operated within an indoor environment and the image data comprises images of a floor within the indoor environment. In some embodiments, the image data comprises images of the floor meeting a wall. In some embodiments, the distance from the movable object to the obstacle is estimated based on an angle of view of the obstacle within the images, wherein a negative angle value is applied in the estimation. In some embodiments, the attitude information is generated by an inertial measurement unit (IMU). In some embodiments, the attitude information comprises at least one of a roll angle, a pitch angle, or a yaw angle of the movable object. In some embodiments, the one or more processors are individually or collectively configured to determine a portion of the field of view of the imaging device that is occupied by the obstacle, based on the image data.

In another aspect, a method of detecting obstacles using a movable object is provided. The method comprises: receiving image data from an imaging device carried by the movable object, wherein the imaging device is configured to have a field of view oriented upward or downward relative to the movable object, and wherein the image data comprises image data of an obstacle positioned at a side of the movable object; and calculating, via one or more processors, a distance between the movable object and the obstacle based on the image data of the obstacle.

In some embodiments, the movable object comprises a plurality of propulsion units configured to effect movement of the movable object. In some embodiments, the movable object is an unmanned aerial vehicle (UAV). In some embodiments, the plurality of propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the field of view of the imaging device is oriented upward relative to the movable object. In some embodiments, the method further comprises operating the movable object within an indoor environment, wherein the image data comprises images of a ceiling within the indoor environment. In some embodiments, the calculating step comprises differentiating between a portion of the image data depicting the ceiling and a portion of the image data depicting the obstacle. In some embodiments, within the indoor environment, the distance from the movable object to the obstacle is estimated based on an angle of view of the obstacle within the images. In some embodiments, the method further comprises operating the movable object within an outdoor environment, wherein the image data comprises images of the sky. In some embodiments, the calculating step comprises differentiating between a portion of the image data depicting the sky and a portion of the image data depicting the obstacle. In some embodiments, within the outdoor environment, the distance from the movable object to the obstacle is estimated based on an angle of view of the obstacle within the images. In some embodiments, the field of view of the imaging device is oriented downward relative to the movable object. In some embodiments, the method further comprises operating the movable object within an indoor environment, wherein the image data comprises images of a floor within the indoor environment. In some embodiments, the image data comprises images of the floor meeting a wall. In some embodiments, the distance from the movable object to the obstacle is estimated based on an angle of view of the obstacle within the images, wherein a negative angle value is applied in the estimation. In some embodiments, the obstacle is located in front of the movable object, behind the movable object, to the left of the movable object, to the right of the movable object, or combinations thereof. In some embodiments, the calculating step comprises determining a portion of the field of view of the imaging device that is occupied by the obstacle, based on the image data.

In another aspect, a system for detecting obstacles using a movable object is provided. The system comprises: an imaging device carried by the movable object and configured to obtain image data, wherein the imaging device is configured to have a field of view oriented upward or downward relative to the movable object, and wherein the image data comprises image data of an obstacle positioned at a side of the movable object; and one or more processors individually or collectively configured to: receive the image data from the imaging device; and calculate a distance between the movable object and the obstacle based on the image data of the obstacle.

In some embodiments, the movable object comprises a plurality of propulsion units configured to effect movement of the movable object. In some embodiments, the movable object is an unmanned aerial vehicle (UAV). In some embodiments, the plurality of propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the field of view of the imaging device is oriented upward relative to the movable object. In some embodiments, the movable object is operated within an indoor environment and the image data comprises images of a ceiling within the indoor environment. In some embodiments, the one or more processors are individually or collectively configured to differentiate between a portion of the image data depicting the ceiling and a portion of the image data depicting the obstacle. In some embodiments, within the indoor environment, the distance from the movable object to the obstacle is estimated based on an angle of view of the obstacle within the images. In some embodiments, the movable object is operated within an outdoor environment and the image data comprises images of the sky. In some embodiments, the one or more processors are individually or collectively configured to differentiate between a portion of the image data depicting the sky and a portion of the image data depicting the obstacle. In some embodiments, within the outdoor environment, the distance from the movable object to the obstacle is estimated based on an angle of view of the obstacle within the images. In some embodiments, the field of view of the imaging device is oriented downward relative to the movable object. In some embodiments, the movable object is operated within an indoor environment and the image data comprises images of a floor within the indoor environment. In some embodiments, the image data comprises images of the floor meeting a wall. In some embodiments, the distance from the movable object to the obstacle is estimated based on an angle of view of the obstacle within the images, wherein a negative angle value is applied in the estimation. In some embodiments, the obstacle is located in front of the movable object, behind the movable object, to the left of the movable object, to the right of the movable object, or combinations thereof. In some embodiments, the one or more processors are individually or collectively configured to determine a portion of the field of view of the imaging device that is occupied by the obstacle, based on the image data.

In another aspect, a method of detecting obstacles using an imaging device carried by a movable object is provided. The method comprises: receiving, at one or more processors, first image data of an obstacle from the imaging device carried by the movable object, wherein the imaging device is arranged on the movable object so as to have a field of view oriented upward or downward relative to the movable object; generating, at the one or more processors, a control signal for controlling one or more propulsion units of the movable object to cause the movable object to move; receiving, at the one or more processors, second image data of the obstacle from the imaging device after the movable object has moved; and calculating, with aid of the one or more processors, a distance between the movable object and the obstacle based on the first image data and the second image data.

In some embodiments, the movable object is an unmanned aerial vehicle (UAV). In some embodiments, the one or more propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the field of view of the imaging device is oriented upward relative to the movable object. In some embodiments, the method further comprises operating the movable object within an indoor environment, wherein the image data comprises images of a ceiling within the indoor environment. In some embodiments, the field of view of the imaging device is oriented downward relative to the movable object. In some embodiments, the method further comprises operating the movable object within an indoor environment, wherein the image data comprises images of a floor within the indoor environment. In some embodiments, the image data comprises images of the floor meeting a wall. In some embodiments, the control signals cause the movable object to move a horizontal distance. In some embodiments, the horizontal distance is about 0.2 m to 1 m. In some embodiments, the control signals cause the movable object to move a vertical distance. In some embodiments, the vertical distance is about 0.2 m to 1 m. In some embodiments, the calculating step comprises assessing the first and second image data in order to detect changes in a portion of the field of view of the imaging device occupied by the obstacle prior to and after the movable object has moved. In some embodiments, the method further comprises determining a horizontal distance or a vertical distance moved. In some embodiments, the horizontal or vertical distance moved is determined using an inertial measurement unit (IMU).

In another aspect, a system for detecting obstacles using a movable object is provided. The system comprises: an imaging device carried by the movable object and configured to obtain image data of an obstacle, wherein the imaging device is arranged on the movable object so as to have a field of view oriented upward or downward relative to the movable object; one or more propulsion units configured to effect movement of the movable object; and one or more processors individually or collectively configured to: receive first image data of the obstacle from the imaging device; generate control signals for controlling the one or more propulsion units to cause the movable object to move; receive second image data of the obstacle from the imaging device after the movable object has moved; and calculate a distance between the movable object and the obstacle based on the first image data and the second image data.

In some embodiments, the one or more processors are individually or collectively configured to determine a height of the obstacle above the movable object, based on the first image data and the second image data. In some embodiments, the distance between the movable object and the obstacle is determined based on the height of the obstacle above the movable object. In some embodiments, the movable object is an unmanned aerial vehicle (UAV). In some embodiments, the one or more propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the field of view of the imaging device is oriented upward relative to the movable object. In some embodiments, the movable object is operated within an indoor environment and the image data comprises images of a ceiling within the indoor environment. In some embodiments, the field of view of the imaging device is oriented downward relative to the movable object. In some embodiments, the movable object is operated within an indoor environment and the image data comprises images of a floor within the indoor environment. In some embodiments, image data comprises images of the floor meeting a wall. In some embodiments, the control signals cause the movable object to move a horizontal distance. In some embodiments, the horizontal distance is about 0.2 m to 1 m. In some embodiments, the control signals cause the movable object to move a vertical distance. In some embodiments, the vertical distance is about 0.2 m to 1 m. In some embodiments, the one or more processors are individually or collectively configured to assess the first and second image data in order to detect changes in a portion of the field of view of the imaging device occupied by the obstacle prior to and after the movable object has moved. In some embodiments, the one or more processors are individually or collectively configured to determine a horizontal distance or a vertical distance moved. In some embodiments, the horizontal or vertical distance moved is determined using an inertial measurement unit (IMU).

In another aspect, a method for determining state information for a movable object is provided. The method comprises: receiving, at one or more processors, image data from an imaging device carried by the movable object, wherein the imaging device is arranged on the movable object so as to have a field of view oriented upwards relative to the movable object; receiving, at the one or more processors, attitude information for the movable object; and calculating, with aid of the one or more processors, at least one of position information or motion information for the movable object based on the image data and the attitude information for the movable object.

In some embodiments, the movable object comprises a plurality of propulsion units configured to effect movement of the movable object. In some embodiments, the movable object is an unmanned aerial vehicle (UAV). In some embodiments, the plurality of propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the method further comprises operating the movable object within an indoor environment, wherein the image data comprises images of a ceiling within the indoor environment. In some embodiments, the attitude information is generated by an inertial measurement unit (IMU). In some embodiments, the attitude information comprises at least one of a roll angle, a pitch angle, or a yaw angle of the movable object. In some embodiments, the motion information comprises velocity of the movable object. In some embodiments, the image data comprises a sequence of images. In some embodiments, the calculating step comprises: detecting feature points in each image of the sequence of images; and determining changes in the feature points over the sequence of images. In some embodiments, the method further comprises generating an environmental map using the movable object. In some embodiments, the environmental map is generated using Simultaneous Localization and Mapping (SLAM) techniques. In some embodiments, the position information is calculated relative to the generated map. In some embodiments, the method further comprises outputting control signals to control position or motion of the movable object, based on the calculated at least one of position information or motion information.

In another aspect, a system for determining state information for a movable object is provided. The system comprises: an imaging device carried by the movable object and configured to obtain image data, wherein the imaging device is arranged on the movable object so as to have a field of view oriented upwards relative to the movable object; and one or more processors individually or collectively configured to: receive the image data from the imaging device; receive attitude information for the movable object; and calculate at least one of position information or motion information for the movable object based on the image data and the attitude information for the movable object.

In some embodiments, the movable object comprises a plurality of propulsion units configured to effect movement of the movable object. In some embodiments, the movable object is an unmanned aerial vehicle (UAV). In some embodiments, the plurality of propulsion units comprises a plurality of rotors. In some embodiments, the imaging device is a camera. In some embodiments, the camera is a monocular camera. In some embodiments, the imaging device comprises an optical axis substantially parallel to a vertical axis of the movable object. In some embodiments, the field of view of the imaging device is about 60 degrees. In some embodiments, the movable object is operated within an indoor environment and the image data comprises images of a ceiling within the indoor environment. In some embodiments, the attitude information is generated by an inertial measurement unit (IMU). In some embodiments, the attitude information comprises at least one of a roll angle, a pitch angle, or a yaw angle of the movable object. In some embodiments, the motion information comprises velocity of the movable object. In some embodiments, the image data comprises a sequence of images. In some embodiments, the one or more processors are individually or collectively configured to: detect feature points in each image of the sequence of images; and determine changes in the feature points over the sequence of images. In some embodiments, the one or more processors are individually or collectively configured to generate an environmental map using the movable object. In some embodiments, the environmental map is generated using Simultaneous Localization and Mapping (SLAM) techniques. In some embodiments, the position information is calculated relative to the generated map. In some embodiments, the one or more processors are individually or collectively configured to output control signals to control position or motion of the movable object, based on the calculated at least one of position information or motion information.

It shall be understood that different aspects of the disclosure can be appreciated individually, collectively, or in combination with each other. Various aspects of the disclosure described herein may be applied to any of the particular applications set forth below. Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWING

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
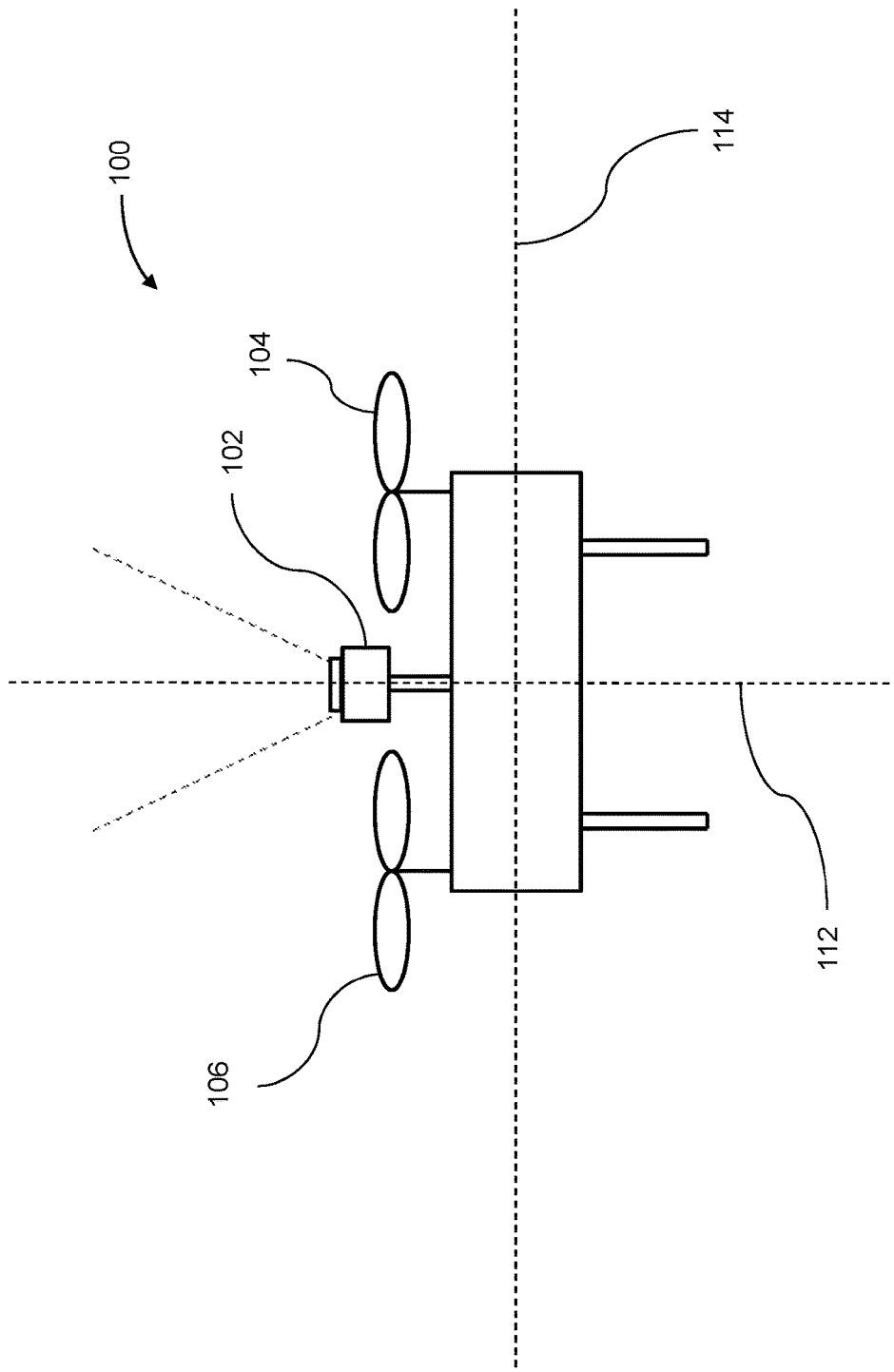
FIG. 1 illustrates a UAV with an imaging device oriented upwards, in accordance with embodiments.

The present disclosure provides systems and methods for obstacle detection and state information determination for movable objects. A movable object, such as an unmanned aerial vehicle (UAV) may be capable of processing information about its environment with the aid of sensors. Arrangement of sensors on a UAV may determine the functionality of the sensors. For example, sensors such as cameras on a UAV may be used to capture image data of the environment. Cameras on the UAV oriented downwards may be utilized in determining state information of the UAV. Cameras on the UAV oriented laterally or sideways may be used to detect obstacles. Cameras on the UAV oriented upwards may be utilized in determining state information of the UAV and/or in detecting and avoiding obstacles. Arrangements provided herein may enable a single sensor to be used for a plurality of functions. For example, a vertically oriented camera may be used to both detect obstacles and determine state information of the UAV.

In some embodiments, a UAV can be adapted to carry one or more sensors. The one or more sensors may be configured to collect relevant data, such as information relating to the UAV's state, the surrounding environment, or the objects and obstacles within the environment. The relevant data may be analyzed, processed, or be used in further applications. For example, based on the relevant data that is collected, it can be possible to generate control signals for controlling UAV navigation. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, six, seven, eight, or more sensors. Optionally, the data can be received from sensors of different types (e.g., two, three, four, five, six, seven, eight, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The sensors can be configured to collect various types of data, such as data relating to the UAV, the surrounding environment, or objects within the environment. For example, at least some of the sensors may be configured to provide data regarding a state of the UAV. The state information provided by a sensor can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translational acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system. A global coordinate system may refer to a coordinate system independent to a location of the UAV or another entity. A local coordinate system may refer to a coordinate system relative to the UAV or another entity. For example, a sensor can be configured to determine the distance between the UAV and the user controlling the UAV, or the distance between the UAV and the starting point of flight for the UAV.

The data obtained by the sensors may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein or landmarks that are recognizable by a processor. Obstacle information may include information regarding the number, density, geometry, spatial disposition, movement, trajectory, and/or velocity of obstacles in the environment.

In some embodiments, a UAV can include one or more vision sensors, also referred to herein as "imaging devices." While many embodiments are described herein as having one imaging device coupled to a UAV, it is to be understood that any number of imaging devices may be coupled to a UAV, such as one, two, three, four, five or more imaging devices. An imaging device can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia).

A sequence of two or more images may be captured by an imaging device. For example, a sequence of about 2, 3, 4, 5, 10, 15, 20, 25, 50, 100, 150, 200, or more images may be captured by the imaging device. The imaging device may capture a sequence of images at a specific capture rate. In some embodiments, the sequence of images may be captured at standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, texture of environment being captured).

In some embodiments, the imaging device can be a camera. A camera can be a movie or video camera that captures dynamic image data (e.g., video). A camera can be a still camera that captures static images (e.g., photographs). A camera can be a binocular camera. A binocular camera as used herein may refer to a stereo, or a stereovision camera. A stereo camera may comprise two cameras. A camera may be a monocular camera. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene.

Images obtained by the imaging devices described herein can be used for a variety of applications related to UAV operation. In some embodiments, the images are used to facilitate UAV navigation within an environment (e.g., autonomously, semi-autonomously, or manually). In some embodiments, the images are used for obstacle detection and avoidance. In some embodiments, the images can be processed to assess or determine state information for the UAV (e.g., position, orientation, velocity, and/or acceleration information). The state information can be assessed or determined using (e.g., processing with one or more processors) one or more images obtained by one or more imaging devices.

The imaging devices may each have a field of view. The field of view of an imaging device may be the extent of the environment that is detectable (e.g., visible) by the imaging device. The field of view may be related to the angle of view, which may be measured by the angular extent of a given scene that is imaged by the imaging device. The angle of view of an imaging device may be at an angle of less than or about 360°, 300°, 240°, 180°, 150°, 120°, 90°60°, 30°, 20°, or 10°. The field of view may be described by the relative direction of the imaging device to the movable object. For example, the field of view may be oriented vertically, horizontally, upward, downward, side-ways, and the like relative to the movable object (e.g., a UAV). The imaging devices may each have an optical axis. The optical axis of an imaging device, which may also be referred to as the "principal axis," can be a line along which there is some degree of rotational symmetry in the imaging device. In some embodiments, the optical axis of the imaging device passes through the center of the optical components (e.g., lens, photo sensor) of the imaging device.

Imaging devices of the present disclosure can be situated on any suitable portion of a movable object, such as above, underneath, on the side(s) of, or within a body of the movable object. Some imaging devices can be mechanically coupled to the UAV such that the spatial disposition and/or motion of the movable object correspond to the spatial disposition and/or motion of the imaging device. The imaging devices can be coupled to the movable object via a rigid coupling, such that the imaging device does not move relative to the portion of the movable object to which it is attached. Alternatively, the coupling between the imaging device and the movable object can permit movement (e.g., translational or rotational movement relative to the UAV) of the imaging device relative to the movable object. The movement of the imaging device relative to the movable object may be controlled remotely by user input, autonomously, or semi-autonomously. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the movable object. Furthermore, the imaging device can be electrically coupled with a portion of the movable object (e.g., processing unit, control system, data storage) so as to enable the data collected by the imaging device to be used for various functions of the UAV (e.g., navigation, control, propulsion, communication with a user or other device, etc.), such as the embodiments discussed herein. The imaging device may be operably coupled with a portion of the UAV (e.g., processing unit, control system, data storage).

The arrangement and/or orientation of the imaging devices relative to the movable object (e.g., a UAV) may determine the utility and limitations of imaging devices. In some embodiments, imaging devices situated underneath the UAV (e.g., an imaging device with a field of view oriented downward relative to the UAV) may be used to determine a speed of the UAV. For example, a sequence of one or more images may be captured by the imaging device, and a change in the relative position of coordinates on the floor may be analyzed within the captured images to determine a speed of the UAV. In some embodiments, imaging devices situated on the side of the UAV (e.g., an imaging device with a field of view oriented frontward, sideward, backward, or laterally relative to the UAV) may be used for obstacle detection and/or avoidance. A processor may determine an obstacle by determining depth information by evaluating information from a sensor. In some methods, for obstacle detection or obstacle avoidance, two or more sensors may be situated on the side of the UAV. For example, an ultrasonic sensor may be used in concert with an imaging device, or two imaging devices may be used together for obstacle detection and/or avoidance. In some embodiments, the imaging device may measure the relative movement of the UAV according to an optical flow of two consecutive images, and recover the actual movement (e.g., distance moved by the UAV) based on measurement of an ultrasonic sensor. In some embodiments, two imaging devices or a binocular camera (e.g., stereovision camera) may be used in concert with a processor to determine a distance to an object. For a UAV having capabilities of obstacle detection and/or avoidance and speed measurement, three or more sensors may be used (e.g., an imaging device situated on the side of the UAV, an imaging device situated underneath the UAV, and an ultrasonic sensor).

FIG. 1 illustrates a UAV 100 with an imaging device 102 oriented upwards, in accordance with embodiments. The imaging device 102 may be arranged on the movable object so as to have a field of view oriented vertically relative to the movable object. "Vertically oriented" may be used herein to refer to an optical axis of the imaging device being aligned with and/or substantially parallel to a vertical axis 112 of the movable object. "Vertical axis" may be used herein to refer to the axis extending from the upper surface (e.g., sky-facing surface) to the lower surface (e.g., ground-facing surface) of the movable object. Thus, the vertical axis of the movable object may vary with an attitude of the movable object. For example, if the movable object tilts 90 degrees relative to a horizontal floor, the vertical axis of the movable object may also tilt 90 degrees relative to the horizontal floor. In this case, for an imaging device fixed relative to the movable object (e.g., imaging device 102 relative to UAV 100), the imaging device may no longer have a field of view oriented vertically relative to the environment (e.g., horizontal floor). However, the imaging device may nonetheless have a field of view oriented vertically relative to the movable object. As used herein, an imaging device arranged on the movable object so as to have a field of view oriented vertically relative to the movable object may refer to an imaging device arranged on the movable object so as to have a field of view oriented upward or downward relative to the movable object and the two terms may be used interchangeably throughout.

An imaging device arranged on the movable object so as to have a field of view oriented upward or downward (e.g., field of view oriented vertically) relative to the movable object may have an optical axis exactly parallel to a vertical axis of the movable object. An imaging device arranged on the movable object so as to have a field of view oriented upward or downward (e.g., field of view oriented vertically) relative to the movable object may have an optical axis substantially parallel to a vertical axis of the movable object. An optical axis substantially parallel to a vertical axis of the movable object may refer to an optical axis within 5°, 10°, 15°, 20°, 25°, 30°, 35°, 40°, or 45° of the vertical axis of the movable object. An imaging device arranged on the movable object so as to have a field of view oriented upward or downward relative to the movable object may have an optical axis within 0 degrees, 5 degrees, 10 degrees, 20 degrees, 30 degrees, 40 degrees, 60 degrees, or 80 degrees of the vertical axis of the movable object. In some instances, an imaging device oriented on the movable object so as to have a field of view oriented upward relative to the movable object may be oriented on or above an upper surface (e.g., sky-facing surface) of the movable object. The imaging device oriented on the movable object so as to have a field of view oriented upward relative to the movable object may have an optical axis exactly parallel to a vertical axis of the movable object. The imaging device oriented on the movable object so as to have a field of view oriented upward relative to the movable object may have an optical axis substantially parallel to a vertical axis of the movable object. An optical axis substantially parallel to a vertical axis of the movable object may refer to an optical axis within 5°, 10°, 15°, 20°, 25°, 30°, 35°, 40°, or 45° of the vertical axis of the movable object. The imaging device oriented on the movable object so as to have a field of view oriented upward relative to the movable object may have an optical axis within 0 degrees, 5 degrees, 10 degrees, 20 degrees, 30 degrees, 40 degrees, 60 degrees, or 80 degrees of the vertical axis of the movable object. In some instances, an imaging device oriented on the movable object so as to have a field of view oriented downward relative to the movable object may be oriented on or below a lower surface (e.g., ground-facing surface) of the movable object. The imaging device oriented on the movable object so as to have a field of view oriented downward relative to the movable object may have an optical axis exactly parallel to a vertical axis of the movable object. The imaging device oriented on the movable object so as to have a field of view oriented downward relative to the movable object may have an optical axis substantially parallel to a vertical axis of the movable object. An optical axis substantially parallel to a vertical axis of the movable object may refer to an optical axis within 5°, 10°, 15°, 20°, 25°, 30°, 35°, 40°, or 45° of the vertical axis of the movable object. The imaging device oriented on the movable object so as to have a field of view oriented downward relative to the movable object may have an optical axis within 0 degrees, 5 degrees, 10 degrees, 20 degrees, 30 degrees, 40 degrees, 60 degrees, or 80 degrees of the vertical axis of the movable object.

An imaging device oriented on the movable object so as to have a field of view oriented upward or downward relative to the movable object may have an optical axis above a lateral axis 114 (or longitudinal axis) of the movable object or below a lateral (or longitudinal axis) of the movable object. In some instances, an imaging device oriented on the movable object so as to have a field of view oriented upward relative to the movable object may have an optical axis above a lateral axis (or longitudinal axis) of the movable object. In some instances, an imaging device oriented on the movable object so as to have a field of view oriented downward relative to the movable object may have an optical axis below a lateral axis or longitudinal axis of the movable object.

An imaging device oriented on the movable object so as to have a field of view oriented vertically relative to the movable object may have a field of view that is either entirely above a lateral axis (or longitudinal axis) of the movable object or entirely below a lateral axis of the movable object. An imaging device oriented on the movable object so as to have a field of view oriented vertically relative to the movable object may have a field of view that is either substantially above a lateral axis (or longitudinal axis) of the movable object or substantially below a lateral axis of the movable object. A field of view that is substantially above or below a lateral axis (or longitudinal axis) of the movable object may refer to a field of view that is at least 50%, 60%, 70%, 80%, or 90% above or below the lateral axis or longitudinal axis of the movable object. In some instances, an imaging device oriented on the movable object so as to have a field of view oriented upward relative to the movable object may have a field of view that is entirely above a lateral axis or longitudinal axis of the movable object. In some instances, an imaging device oriented on the movable object so as to have a field of view oriented upward relative to the movable object may have a field of view that is substantially above a lateral axis or longitudinal axis of the movable object. A field of view that is substantially above a lateral axis or longitudinal axis of the movable object may refer to a field of view that is at least 50%, 60%, 70%, 80%, or 90% above the lateral axis or longitudinal axis of the movable object. In some instances, an imaging device oriented on the movable object so as to have a field of view oriented downward relative to the movable object may have a field of view that is entirely below a lateral axis or longitudinal axis of the movable object. In some instances, an imaging device oriented on the movable object so as to have a field of view oriented downward relative to the movable object may have a field of view that is substantially below a lateral axis or longitudinal axis of the movable object. A field of view that is substantially below a lateral axis or longitudinal axis of the movable object may refer to a field of view that is at least 50%, 60%, 70%, 80%, or 90% below the lateral axis or longitudinal axis of the movable object.

An imaging device that has a field of view that is oriented upward or downward relative to the movable object may capture image data of an environment entirely above the lateral or longitudinal axis of the movable object or image data of an environment entirely below the lateral or longitudinal axis of the movable object. An imaging device that has a field of view that is oriented upward or downward relative to the movable object may capture image data of an environment substantially above the lateral or longitudinal axis of the movable object or image data of an environment substantially below the lateral or longitudinal axis of the movable object. Image data of an environment substantially above or below the lateral or longitudinal axis of the movable object may refer to image data of an environment at least 50%, 60%, 70%, 80%, or 90% above or below the lateral or longitudinal axis of the movable object. In some instances, an imaging device that has a field of view oriented upward or downward relative to a movable object may capture images that contain image data of an environment that is at least 50%, 60%, 70%, 80%, 90%, or 100% above a lateral axis (or longitudinal axis) of the movable object or image data of an environment that is at least 50%, 60%, 70%, 80%, 90%, or 100% below a lateral axis (or longitudinal axis) of the movable object.

In some instances, an imaging device that has a field of view oriented upward relative to the movable object may capture image data of an environment entirely above the lateral or longitudinal axis of the movable object. In some instances, an imaging device that has a field of view oriented upward relative to the movable object may capture image data of an environment substantially above the lateral or longitudinal axis of the movable object. Image data of an environment substantially above the lateral or longitudinal axis of the movable object may refer to image data of an environment that is at least 50%, 60%, 70%, 80%, or 90% above the lateral or longitudinal axis of the movable object. In some instances, an imaging device that has a field of view oriented upward relative to a movable object may capture images that contain image data of an environment that is at least 50%, 60%, 70%, 80%, 90%, or 100% above a lateral axis (or longitudinal axis) of the movable object.

In some instances, an imaging device that has a field of view oriented downward relative to the movable object may capture image data of an environment entirely below the lateral or longitudinal axis of the movable object. In some instances, an imaging device that has a field of view oriented downward relative to the movable object may capture image data of an environment substantially below the lateral or longitudinal axis (or longitudinal axis) of the movable object. Image data of an environment substantially below the lateral or longitudinal axis of the movable object may refer to image data of an environment that is at least 50%, 60%, 70%, 80%, or 90% below the lateral or longitudinal axis of the movable object. In some instances, an imaging device that has a field of view oriented downward relative to a movable object may capture images that contain image data of an environment that is at least 50%, 60%, 70%, 80%, 90%, or 100% below a lateral axis (or longitudinal axis) of the movable object.

While imaging device 102 is shown located above the movable object, systems and methods provided herein may be equally applicable to imaging devices located below the movable object. The imaging devices disclosed herein may be mounted on an upper surface of the UAV, a lower surface of the UAV, on top of or below a central body of the UAV, on top of or below a peripheral portion of the UAV, and the like. Thus, an imaging device arranged on the movable object so as to have a field of view oriented vertically relative to the movable object may have a field of view oriented downward relative to the movable object. While the imaging device 102 is shown located substantially near the center of the UAV, it is to be understood that the imaging device may be located anywhere on the movable object (e.g., near the center, near the edge, etc.). The imaging device 102 may capture one or more images in an indoor or outdoor environment. Imaging device 102 may further be used together with one or more processors for navigation, obstacle detection, obstacle avoidance, state determination (e.g., speed measurement), positioning, and the like. The movable object may comprise a plurality of propulsion units (e.g., 104, 106) configured to affect movement of the movable object. The propulsion units may comprise a plurality of rotors.

A vertically oriented imaging device may be used to both detect obstacles and determine a state information of the UAV. In some embodiments, a single vertically oriented imaging device may have functionalities that cannot be performed by a single laterally oriented imaging device. In some embodiments, imaging devices on the UAV oriented laterally or sideways may be used to detect obstacles, but may not be capable of determining certain types of UAV state information. For example, image data from a single laterally oriented imaging device may not be useful for determining the position and/or velocity of the UAV when the UAV is moving in a direction substantially parallel to the optical axis of the imaging device. In some embodiments, a single imaging device oriented vertically (e.g., upwards or downwards) may be used to determine state information of the UAV (e.g., position, velocity) and to detect obstacles, as described further herein. A multi-functional imaging device may have advantages such as reduced costs (e.g., versus cost of having two or more imaging devices), lowered weight (e.g., versus weight of having two or more imaging devices) for a UAV, and the like.

Figure 2:
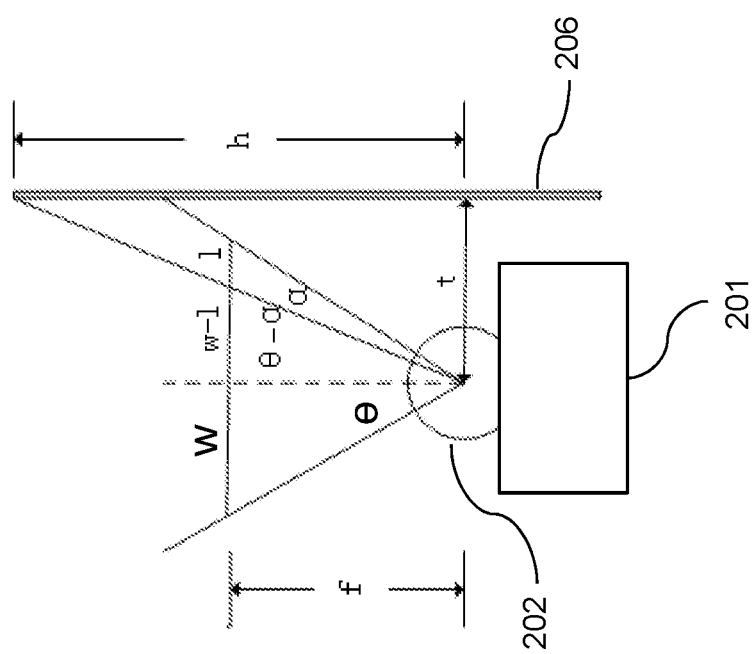
FIG. 2 illustrates a schematic of obstacle detection and avoidance, in accordance with embodiments.

FIG. 2 illustrates a schematic of obstacle detection and avoidance, in accordance with embodiments. FIG. 2 shows a movable object 201 with an upward facing imaging device 202 near an obstacle 206. While FIG. 2 depicts an upward facing imaging device, the embodiments described herein may be equally applicable to downward facing imaging devices. An obstacle may be located to a side (e.g., lateral side) of the movable object, e.g., rather than being above or below the movable object, as shown in FIG. 2. Only a part of an obstacle may be located to a lateral side of the movable object as shown by obstacle 206. An obstacle located to a lateral side of the movable object may be located in front of the movable object, behind the movable object, to the left of the movable object, to the right of the movable object, or combinations thereof.

The imaging device may have an angle of view $2\theta$ and a focal length f. When the obstacle is sufficiently close to the imaging device 202, e.g., within a distance t, the obstacle may occupy a portion of the viewing angle, a. An image captured by the imaging device may have a width 2w at a focal plane, of which part is occupied by the obstacle. The width of the image occupied by the obstacle may be referred to herein as l. θ, f, and w may be known parameters. l may be determined using one or more processors. For example one or more processors may receive an image containing an obstacle. The one or more processors may distinguish (e.g., differentiate) obstacles within the image from other parts (e.g., distinguish l from 2w−l) via segmentation algorithms. Segmentation algorithms may divide an image into multiple parts. A segmented image data may be used to identify relevant information in digital images. For example, images may be segmented using thresholding, clustering methods (e.g., k-means clustering), compression-based methods, histogram-based methods, feature detection, edge detection, dual clustering methods, region-growing methods, partial differential equation-based methods, graph partitioning methods, watershed transformations, model based segmentation, multi-scale segmentation, semi-automatic segmentation, trainable segmentation, segmentation benchmarking, and the like. Distinguishing an obstacle within the image may comprise detecting an obstacle.

In images in which one or more obstacles are easily distinguished from the other parts (e.g., background), color-based image segmentation algorithms, such as a K-Means clustering algorithm may be used. For example, for a movable object operating in an outdoor environment with an imaging device oriented vertically relative to the movable object, captured images may contain obstacles (e.g., a pole) and a background (e.g., the sky). The obstacle may be easily distinguished from the background in some embodiments (e.g., blue, clear sky and obstacle of yellow color) and a color-based image segmentation algorithm may be used to distinguish the obstacle. In some embodiments, other segmentation methods, techniques, or algorithms as described herein may be used. The processor may further calculate or measure a width (e.g., l of FIG. 2), length, or area of the obstacle in the image.

In images in which one or more obstacles are not easily distinguished from the other parts (e.g., background), a corner detection algorithm may be used. For example, a movable object operating in an indoor environment coupled to an imaging device may acquire image data containing obstacles (e.g., a wall) and a background (e.g., a floor or a ceiling). The image data may comprise images of the floor or ceiling meeting a wall. The obstacle may not easily be distinguished from the background in some embodiments (e.g., wall and the ceiling are of the same white color) and a corner detection algorithm may be used to detect the boundary between the obstacle and a background. Based on the detected boundary, the obstacle may be distinguished from the background. In some embodiments, other segmentation methods, techniques, or algorithms as described herein may be used. The obstacle may be distinguished and the processor may further calculate or measure a width, length, or area of the obstacle.

In FIG. 2, defining h to be the height of the obstacle from a position on a horizontal plane of the movable object to the top of the obstacle, the field of view (e.g., angle of view) occupied by the obstacle (α) can be calculated according to equations (1) and (2):

$$w - l = f * \tan(\theta - \alpha) \quad (1)$$

$$\alpha = \theta - \arctan\left(\frac{w-l}{f}\right) \quad (2)$$

In some embodiments, a distance t from the movable object to the obstacle may be determined directly from the angle α determined in equation (2). A range of possible distances t may be determined directly from the angle α determined in equation (2). For example, in an indoor environment, a possible range of h may be known and small, where h is as previously defined. For example, in an indoor environment having a fixed height of 3 meters, h may range from 3 meters (e.g., UAV is on the floor) to 0 meters (e.g., UAV is touching the ceiling). Accordingly, a range of possible distances from the movable object to the obstacle may be calculated according to the equation:

$$t = h * \tan(\theta - \alpha) \quad (3)$$

In some embodiments, a range of possible distances t may not be able to be determined directly from the angle α determined in equation (2). For example, in an outdoor environment, a possible range of h may be unknown. If known, the range h of may vary greatly (e.g., between 0 and 500 meters) and t calculated based on it may vary greatly.

Alternatively or in addition, t may be determined indirectly from the angle α as described further below. For example, t can be determined based on the changes in the angle α as the movable object moves. The movement of the movable object may be along a known or predetermined path and/or may be of a specified (e.g., predetermined) distance. In some instances, the movement of the movable object may be of a specified vertical and/or horizontal distance. This approach can be used to improve the accuracy of the calculation of t.

Figure 3:
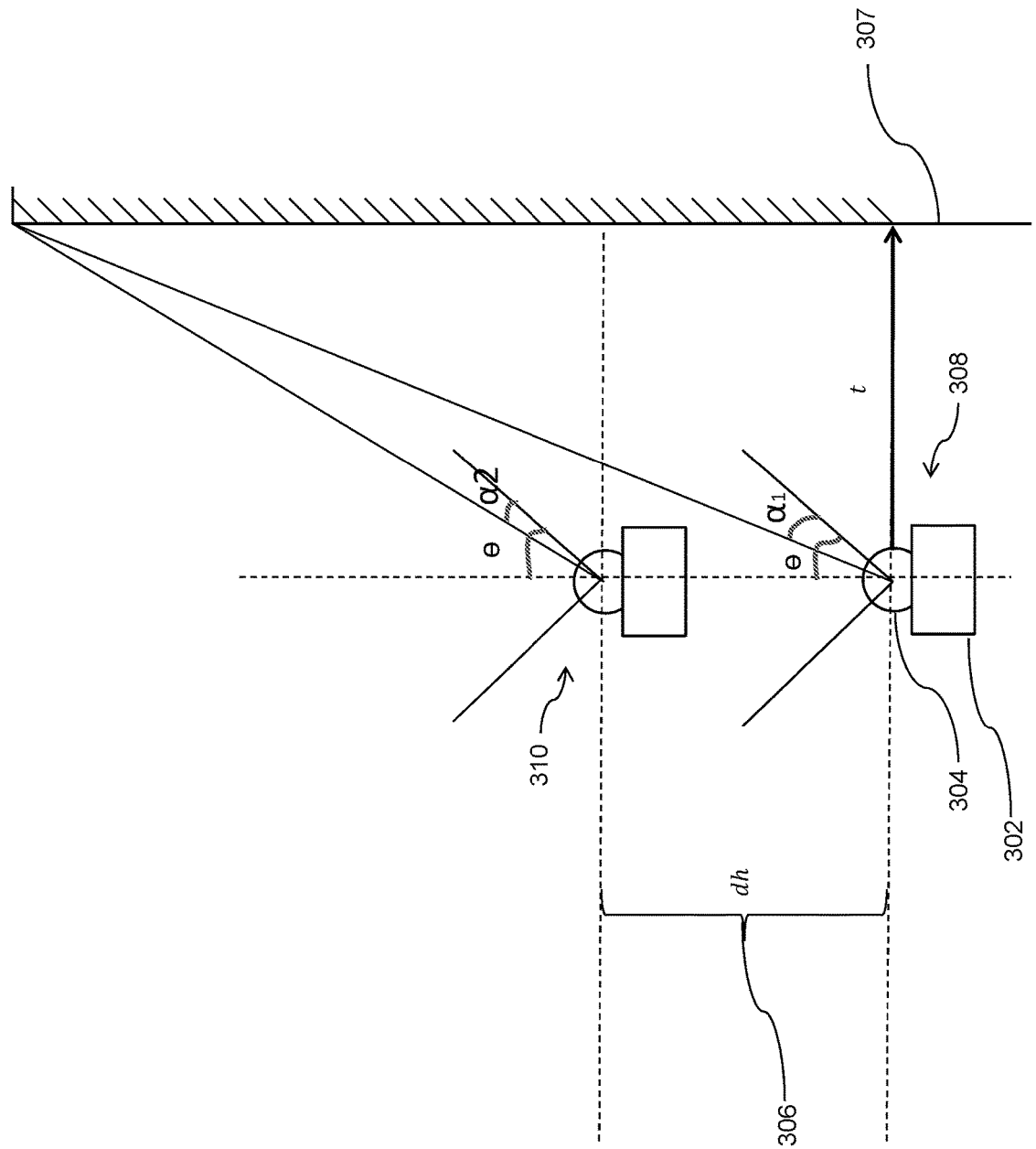
FIG. 3 illustrates a movable object with an imaging device moving a vertical distance, in accordance with embodiments.

FIG. 3 illustrates a movable object 302 with an imaging device 304 moving a vertical distance 306, in accordance with embodiments. The imaging device may capture one or more images at a first location 308. The movable object may travel a vertical distance 306 and the imaging device may further capture one or more images at a different location 310. Taking equation (3) and dividing both sides by tan(θ−α), $$h = t * \cot(\theta - \alpha) \quad (4)$$

$$dh = \frac{t}{\sin^2(\theta - \alpha)} d\alpha$$

$$t = \sin^2(\theta - \alpha) \frac{dh}{d\alpha}$$

t may be obtained using equation (4). dh of equation (4) may refer to a vertical distance traveled by the movable object. For example, with respect to FIG. 3, dh may refer to the vertical distance 306 between location 308 and 310. The height, or vertical distance traveled by the movable object may be measured by a sensor, such as an inertial measurement unit (IMU) or a GPS sensor. dh may be about or less than 1 cm, 2 cm, 5 cm, 0.1 m, 0.2 m, 0.5 m, 1 m, 2 m, 5 m, or 10 m. In some instances, dh may be about 0.2 m to 1 m. The change in the field of view occupied by the obstacle 307 due to the vertical distance traveled by the movable object may be defined by dα=α$_1$−α$_2$, where α$_1$ and α$_2$ are the fields of view occupied by the obstacle each at a location before the vertical movement and after the vertical movement as illustrated in FIG. 3 or α$_1$ or α$_2$ may be used in equation (4)

for α and θ may be a constant regardless of the UAV location. Multiple dh and corresponding dα may be obtained (e.g., move the movable object a vertical distance multiple times), and an average distance of the movable object from the obstacle (t) may be obtained for improved accuracy.

In some instances, dh may be determined or measured unconditionally each time the movable object travels a vertical distance. In some instances, dh may be determined only if one or more conditions are satisfied. For example, dh may be determined when a noticeable change of α(dα) is detected. In some embodiments, a noticeable change of α may be equal to about or less than 5°, 10°, 15°, 20°, 25°, 30°, 35°, 40°, or 45°.

Figure 4:
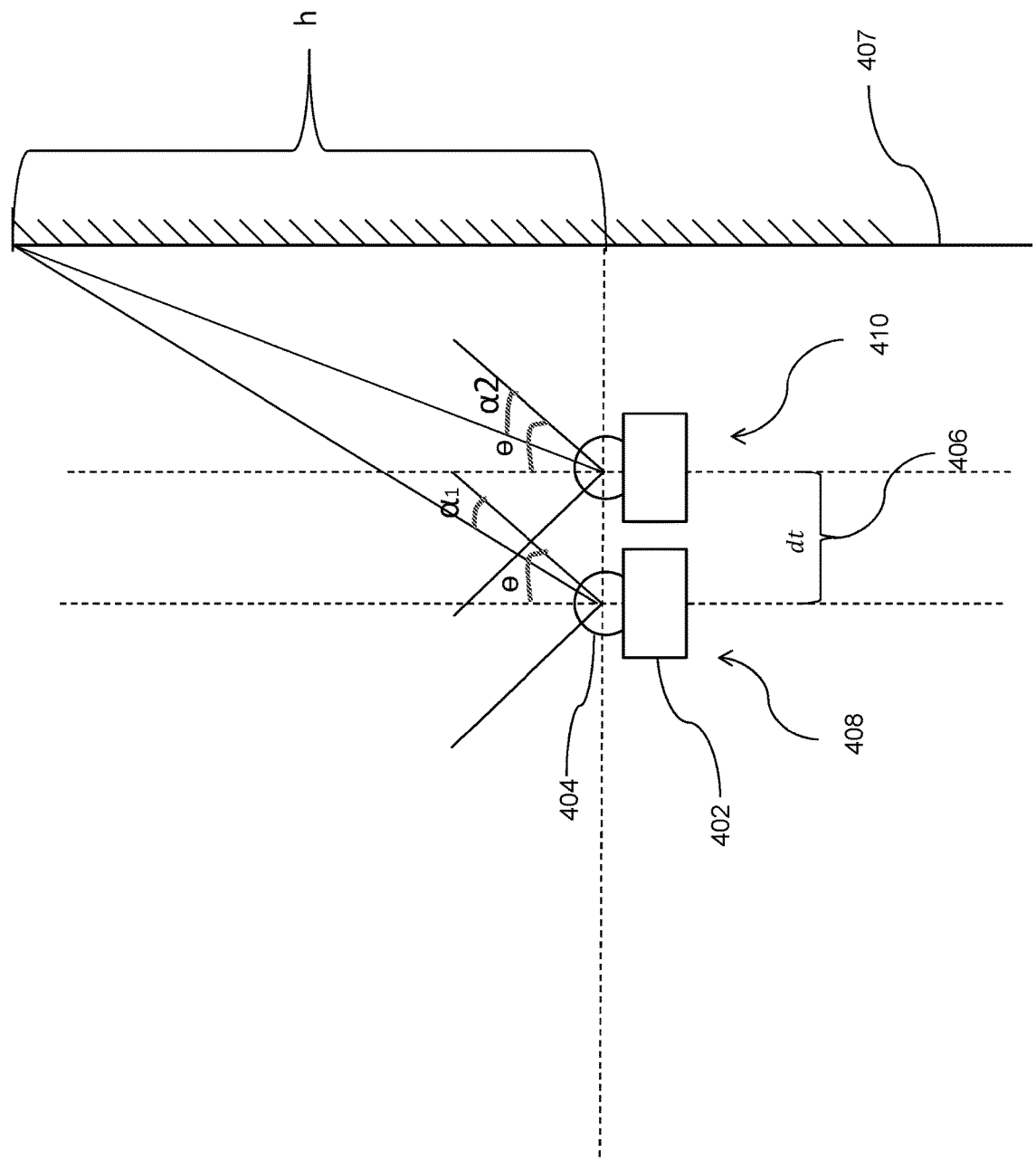
FIG. 4 illustrates a movable object with an imaging device moving a horizontal distance, in accordance with embodiments.

FIG. 4 illustrates a movable object 402 with an imaging device 404 moving a horizontal distance 406, in accordance with embodiments. The imaging device may capture one or more images at first location 408. The movable object may travel a horizontal distance dt and the imaging device may capture one or more images at a second location 410. Equation (3) can further be differentiated to become, $$dt = \frac{t}{\sin^2(\theta - \alpha)} d\alpha \quad (5)$$

$$h = -\sin^2(\theta - \alpha) \frac{dt}{d\alpha}$$

h may be obtained using equation (5). dt of equation (5) may refer to a horizontal distance traveled by the movable object. For example, with respect to FIG. 4, dt may refer to the horizontal distance 406 between location 408 and 410. The horizontal distance traveled by the movable object (dt) may be measured by a sensor, such as an inertial measurement unit (IMU) or a GPS sensor. dt may be about or less than 1 cm, 2 cm, 5 cm, 0.1 m, 0.2 m, 0.5 m, 1 m, 2 m, 5 m, or 10 m. In some instances, dt may be about 0.2 m to 1 m. The change in the field of view occupied by the obstacle due to the horizontal distance traveled by the movable object may be defined by dα=α₁−α₂, where α₁ and α₂ are the fields of view occupied by the obstacle 407 each at a location before the horizontal movement and after the horizontal movement, as illustrated in FIG. 4. α₁ or α₂ may be used in equation (5) for α and θ may be a constant regardless of the UAV location. Having solved for h, the distance of the movable object from the obstacle (t) may be obtained using equation (3). Multiple dt and corresponding dα may be obtained (e.g., move the movable object a horizontal distance multiple times), and an average distance of the movable object from the obstacle (t) may be obtained for improved accuracy.

In some instances, dt may be determined or measured unconditionally each time the movable object travels a horizontal distance. In some instances, dt may be determined only if one or more conditions are satisfied. For example, dt may be determined when a noticeable change of α(dα) is detected. In some embodiments, a noticeable change of α may be equal to about or less than 5°, 10°, 15°, 20°, 25°, 30°, 35°, 40°, or 45°.

Figure 5:
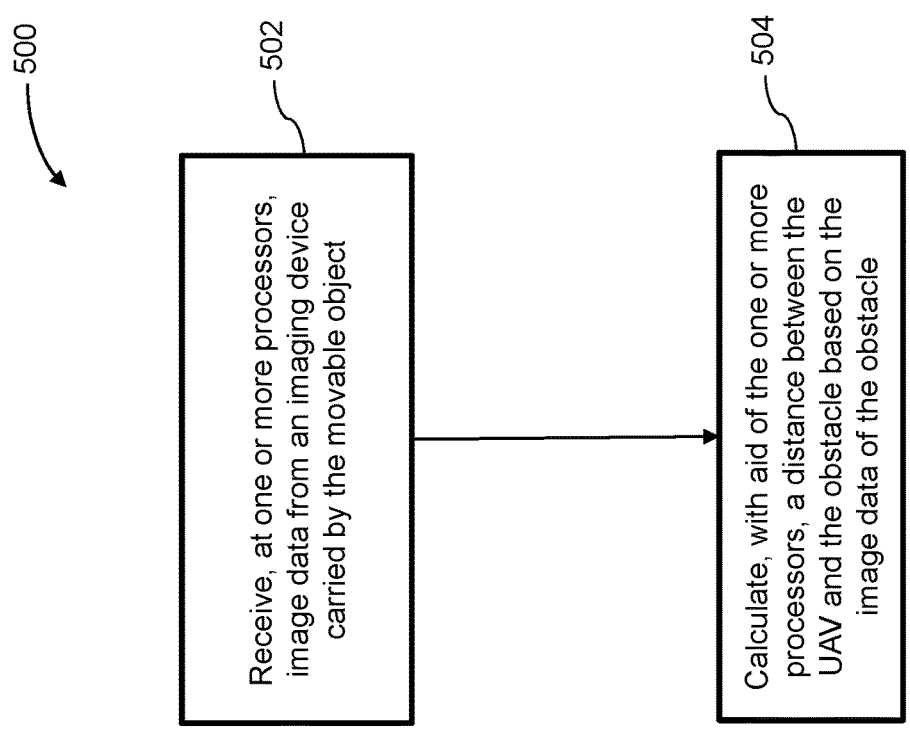
FIG. 5 illustrates a method of detecting obstacles using a movable object, in accordance with embodiments.

FIG. 5 illustrates a method 500 of detecting obstacles using a movable object, in accordance with embodiments. In step 502, one or more processors may receive image data from an imaging device carried by the movable object. The image data may comprise obstacle image data and other (e.g., background) image data. For example, for a movable object operating in an indoor environment, the image data may comprise images of a wall (e.g., an obstacle) and a ceiling (e.g., a background). For example, for a movable object operating in an outdoor environment, the image data may comprise images of an object (e.g., an obstacle) and the sky (e.g., a background). The image data may comprise data of one or more images captured by the imaging device. For example, the image data may comprise about 1, 2, 3, 4, 5, 10, 20, 50, 100, 200, 500, 1000, or more images. The image data may comprise a sequence of images, as described herein. In some embodiments, a processor may comprise a field-programmable gate array (FPGA), application-specific integrated circuit (ASIC), application-specific standard product (ASSP), or complex programmable logic devices (CPLD). In some embodiments, the processor may be an embedded processor carried by the UAV. Alternatively, the processor may be separated from the movable object (e.g., at a ground station, communicating with the movable object). The imaging device may be arranged on the movable object so as to have a field of view oriented vertically relative to the movable object (e.g., upwards or downwards), as mentioned herein. The obstacle may be located to a side (e.g., lateral side) of the movable object, e.g., rather than being above or below the movable object. For example, the obstacle may be located in front of the movable object, behind the movable object, to the left of the movable object, to the right of the movable object, or combinations thereof. For example, at least a part of the obstacle may be located on a lateral side of the UAV. Thus, in some embodiments, the image data received by processors in step 502 may comprise image data of an obstacle positioned at a lateral side of the movable object.

In step 504, the one or more processors may calculate a distance between the movable object and the obstacle. The calculation may be based on the image data of the obstacle. Calculating a distance between the movable object and the obstacle may comprise detecting an obstacle. Calculating a distance between the movable object and the obstacle may comprise differentiating between a portion of the image data depicting the background and a portion of the image data depicting the obstacle. Calculating a distance between the movable object and the obstacle may comprise segmenting the image data. Segmenting an image data may comprise threshold methods (e.g., Otsu's method), color-based segmentation (e.g., K-means clustering), transform methods (e.g., watershed segmentation), texture methods (e.g., texture filters), and the like as mentioned herein.

There may be a variety of ways to calculate a distance between the movable object and the obstacle, as further described below. The calculation may depend on external factors, such as the environment type (e.g., indoor, outdoor, etc.) in which the movable object is operating in. The distance from the movable object to the obstacle may be estimated based on an angle of view of the obstacle within the image data. In some embodiments, a negative angle value may be applied in the estimation. As used herein, an angle of view may have a negative angle value when an imaging device has an optical axis below the horizontal axis.

Based on detection of the obstacle or the calculation of step 504, one or more processors may initiate an obstacle avoidance program and/or generate a warning signal. For example, as soon as an obstacle is detected, an obstacle avoidance program may be initiated and/or a warning signal may be generated. For example, if the distance between the movable object and the obstacle is calculated to be about 0.1 m, 0.2 m, 0.3 m, 0.4 m, 0.5 m, 0.75 m, 1 m, 1.25 m, 1.5 m, 2 m, 2.5 m, 3 m, 4 m, 5 m, 10 m, 15 m, 20 m, 50 m, 100 m, 150 m, or more, an obstacle avoidance program may be initiated and/or a warning signal may be generated. The obstacle avoidance program may involve disallowing the movable object to proceed in the direction of the obstacle. The obstacle avoidance program may involve moving the movable object in an opposite direction of the detected obstacle (e.g., via control signals output to propulsion units of the movable object). The obstacle avoidance program may involve generating and outputting control signals to one or more propulsion units of the movable object to move the movable object (e.g., vertical or lateral movements) such that the obstacle is avoided. Warning signals may involve outputting haptic, visual, or auditory warnings to an operator or a user. For example, the movable object or components coupled with the movable object may output flashing lights to signal a warning. For example, a visual warning may be displayed on a remote control of an operator to signal a warning. For example, a sound may be generated from the movable object, a remote control, or any other components coupled with the movable object to signal a warning. For example, the UAV, a remote control, or any other components coupled with the movable object may vibrate to signal a warning.

While imaging devices arranged on a movable object so as to have a field of view oriented vertically relative to the movable object and an obstacle located to a lateral side of the movable object has been discussed primarily herein, the methods and systems may be equally applicable to any arrangement in which an optical axis of the imaging device relative to an obstacle and a location of the imaging device relative to the obstacle is substantially similar to the arrangement discussed herein. For example, the methods and systems may be applied to imaging devices arranged on a movable object so as to have a field of view oriented horizontally relative to the movable object and an obstacle located above or below the movable object. This may include when an optical axis is substantially directed in a first direction and the obstacle is in a second direction from the imaging device substantially perpendicular to the first direction.

Figure 6:
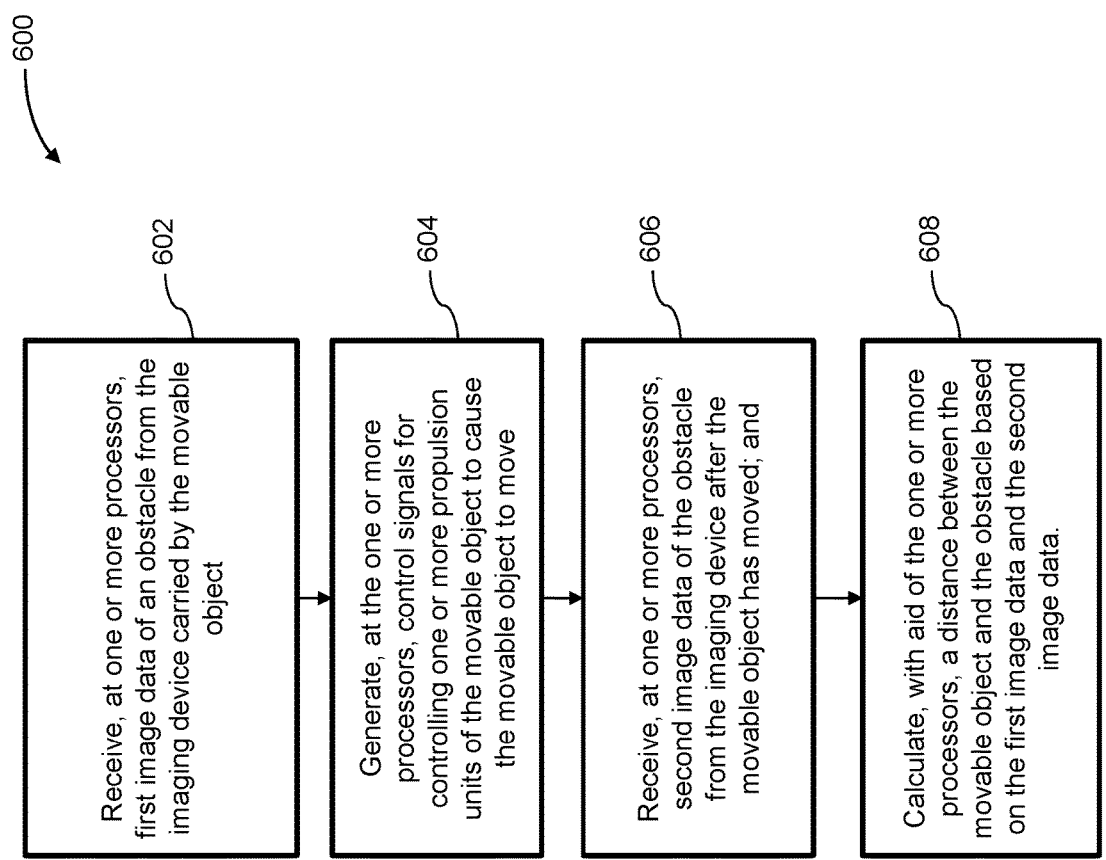
FIG. 6 illustrates a method of detecting obstacles using an imaging device carried by a movable object, in accordance with embodiments.

FIG. 6 illustrates a method 600 of detecting obstacles using an imaging device carried by a movable object, in accordance with embodiments. In step 602, one or more processors may receive a first image data of an obstacle from the imaging device carried by the movable object, substantially as described herein. The imaging device may be arranged on the movable object so as to have a field of view oriented upward or downward (e.g., vertically) relative to the movable object.

In step 604, the one or more processors may generate control signals for controlling one or more propulsion units of the movable object to cause the movable object to move. In some instances, the movement of the movable object may be in a horizontal direction, a vertical direction, or any combination thereof. The horizontal and/or vertical movement may be of any combination and/or sequence. The movable object may move in a predetermined path or sequence which may include any horizontal and/or vertical distance. The movable object may move without a predetermined path or sequence in any direction (e.g., horizontal and/or vertical direction) and in any distance (e.g., horizontal and/or vertical direction). Alternatively or in conjunction, the movable object may process the first image data and based on information obtained (e.g., obstacle detected), move in a certain direction (e.g., horizontal and/or vertical direction). Movement of the UAV may cause the UAV to move a certain horizontal and/or vertical distance. The horizontal distance that is moved may be about 0.01 m, 0.05 m, 0.1 m, 0.2 m, 0.5 m, 0.75 m, 1 m, 1.5 m, 2 m, or more.

The vertical distance that is moved may be about 0.01 m, 0.05 m, 0.1 m, 0.2 m, 0.5 m, 0.75 m, 1 m, 1.5 m, 2 m, or more. The horizontal distance and/or vertical distance moved may be measured and stored in a processor. For example, the distance the movable object moves may be measured by an inertial measurement unit and the measurement may be stored in the one or more processors.

In step 606, the one or more processors may receive a second image data of the obstacle from the imaging device after the movable object has moved. In step 608, the one or more processors may calculate a distance between the movable object and the obstacle based on the first image data and the second image data, substantially as described herein. The calculating step may comprise assessing the first and second image data in order to detect changes in a portion of the field of view of the imaging device occupied by the obstacle prior to and after the movable object has moved the horizontal and/or vertical distance.

Method 600 may be repeated as desired. A plurality of distances between the movable object and the obstacle may be obtained. Statistical analysis may be performed on the plurality of distances obtained between the movable object and the obstacle for improved accuracy. For example, the plurality of distances obtained between the movable object and the obstacle may be averaged for improved accuracy. Method 600 may be repeated about or more than 1, 2, 3, 4, 5, 10, or 20 times before determining a distance between the movable object and the obstacle.

Figure 7:
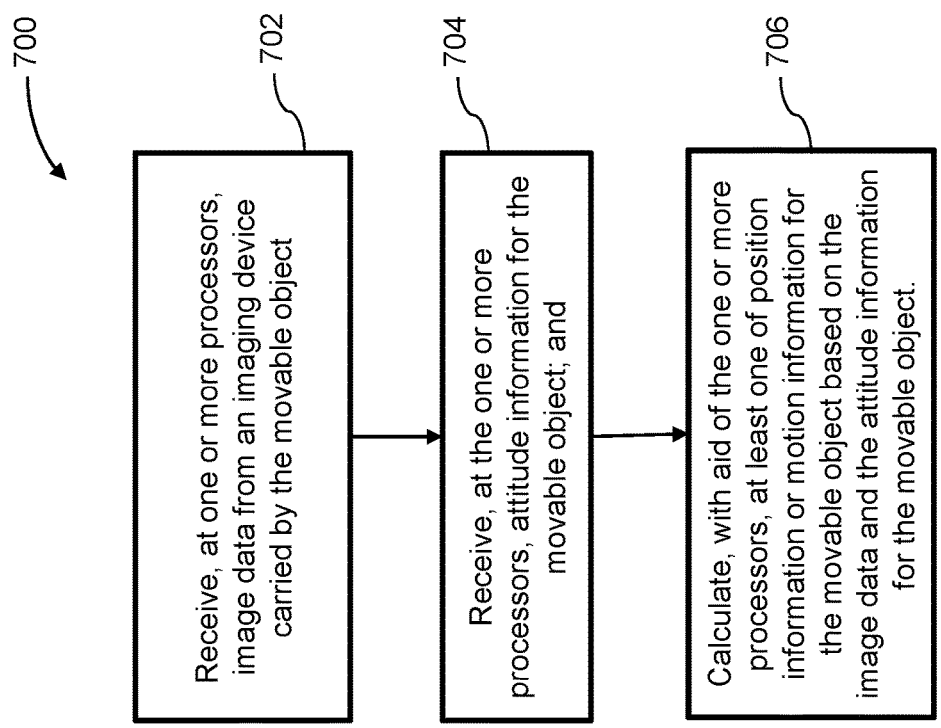
FIG. 7 illustrates a method for determining state information for a movable object, in accordance with embodiments.

FIG. 7 illustrates a method 700 for determining state information for a movable object, in accordance with embodiments. In step 702, one or more processors may receive image data from an imaging device carried by the movable object. The imaging device may be arranged on the movable object so as to have a field of view oriented upwards relative to the movable object, substantially as described herein. An upward facing camera may capture images including a background. For example, the background may comprise a ceiling (e.g., in an indoor environment) or the sky (e.g., in an outdoor environment). The obstacle may be easily distinguished from the background in some embodiments (e.g., blue, clear sky and obstacle of different color) and segmentation algorithm may be used to distinguish the obstacle as described herein. Thus, an upward facing camera may advantageously capture images which may be likely to have backgrounds of lower complexity than other orientations, which may increase the ease with which an obstacle may be distinguished from the background. This may result in less processing power being required to analyze the captured image.

In step 704, the one or more processors may receive attitude information for the movable object. The attitude information may comprise a roll orientation, a pitch orientation, or a yaw orientation of the movable object.

In step 706, the one or more processors may calculate at least one of position information or motion information for the movable object based on the image data and the attitude information for the movable object. For example, if the movable object is tilted, such that the vertical axis of the UAV is not perpendicular to the straight line distance to the obstacle, the one or more processors may need to account for the angle of tilt in the position and/or motion information calculations. In some instances, the attitude information for the movable object may be used to accurately calculate or determine state information (e.g., position or motion information) of the movable object. For example, when a UAV has a roll or pitch orientation, an image taken (e.g., captured) by the imaging device may be a transformed version (e.g., via affine transform) of an image captured by an imaging device on a UAV that has no roll or pitch orientation. In such a case, a coordinate rotation of the image may be effected based on the attitude information for the movable object. Assuming roll and pitch angles of $\psi$ and $\phi$, a corresponding rotation matrix R can be formulated as shown below. In some instances, a yaw angle is not important and may be ignored.

$$R = \begin{pmatrix} \cos\phi & 0 & \sin\phi \\ 0 & 1 & 0 \\ -\sin\phi & 0 & \cos\phi \end{pmatrix} \begin{pmatrix} 1 & 0 & 0 \\ 0 & \cos\psi & -\sin\psi \\ 0 & \sin\psi & \cos\psi \end{pmatrix}$$

For pixel (u,v) on the image, a 3D point (x,y,z) in focal plane corresponding to the pixel may be calculated as follows:

$$\begin{pmatrix} x \\ y \\ z \end{pmatrix} = K^{-1} \begin{pmatrix} u \\ v \\ 1 \end{pmatrix}$$

The 3D point may further be rotated according to rotation matrix:

$$\begin{pmatrix} x' \\ y' \\ z' \end{pmatrix} = R \begin{pmatrix} x \\ y \\ z \end{pmatrix}$$

The rotated 3D point may be projected onto the image plane according to the following which may be used to more accurately determine a position or motion information of the UAV:

$$\begin{pmatrix} u' \\ v' \\ 1 \end{pmatrix} = K \begin{pmatrix} x' \\ y' \\ z' \end{pmatrix} = KRK^{-1} \begin{pmatrix} u \\ v \\ 1 \end{pmatrix}$$

The motion information may comprise a velocity of the movable object. For example, the one or more processors may receive a sequence of two or more images. The processors may analyze the sequence of images and determine a change. For example, the processor may detect a reproducible feature within the image and determine its relative position within the image over the sequence of images. The processor may compare the relative position change against a time lapse between the sequence of images to determine a speed of the movable object. Step 706 may comprise detecting feature points in each image of the sequence of images and determining changes in the feature points over the sequence of images. A feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature detection as described herein can be accomplished using various algorithms which may extract one or more feature points from image data. The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

Step 706 may involve calculating a position information for the movable object. An environmental map may be generated using the movable object. For example, the environmental map may be generated using Simultaneous Localization and Mapping (SLAM) techniques. For example, in a limited indoor environment, the one or more imaging devices may acquire images of the various areas of the environment. The one or more processors may further process the image data and create a global map of the environment. The position of the movable object may be calculated relative to the generated map of the environment.

Based on at least one of the calculated position information or motion information, control signals may be output to control the position or motion of the movable object. For example, if the movable object is determined to be going above some threshold velocity, control signals may be output to reduce the velocity of the movable object. For example, if the movable object is determined to be going below some threshold velocity, control signals may be output to increase the velocity of the movable object.

Figure 8:
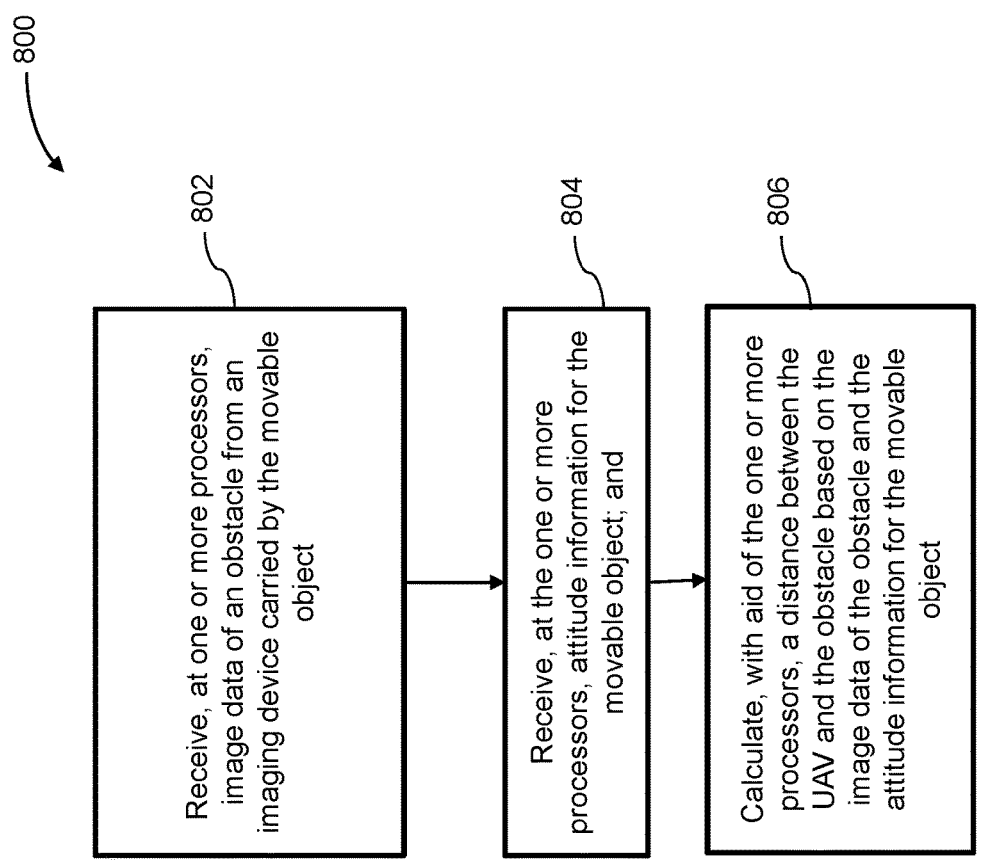
FIG. 8 illustrates a method of detecting obstacles using a movable object, in accordance with embodiments.

FIG. 8 illustrates a method of detecting obstacles using a movable object, in accordance with embodiments. In step 802, one or more processors may receive image data of an obstacle from an imaging device carried by the movable object, substantially as described herein. The imaging device may be arranged on the movable object so as to have a field of view oriented upwards relative to the movable object.

In step 804, one or more processors may receive an attitude information for the movable objects. The attitude information may be generated by a sensor, such as an inertial measurement unit (IMU). The attitude may comprise a roll orientation, a pitch orientation, or a yaw orientation of the vehicle.

In step 806, the one or more processors may calculate a distance between the movable object and the obstacle based on the image data of the obstacle and the attitude information for the movable object, substantially as described herein. For example, if the movable object is tilted, such that the vertical axis of the UAV is not perpendicular to the straight line distance to the obstacle, the one or more processors may need to account for the angle of tilt in the obstacle distance calculations.

In some instances, the attitude information for the movable object may be used to accurately calculate or determine a distance between the movable object and the obstacle. For example, when a UAV has a roll or pitch orientation, an image taken (e.g., captured) by the imaging device may be a transformed version (e.g., via affine transform) of an image captured by an imaging device on a UAV that has no roll or pitch orientation. In such a case, a coordinate rotation of the image may be effected based on the attitude information of the movable object. Assuming roll and pitch angles of ψ and φ, a corresponding rotation matrix R can be formulated as shown below. In some instances, a yaw angle is not important and may be ignored.

$$R = \begin{pmatrix} \cos\phi & 0 & \sin\phi \\ 0 & 1 & 0 \\ -\sin\phi & 0 & \cos\phi \end{pmatrix} \begin{pmatrix} 1 & 0 & 0 \\ 0 & \cos\psi & -\sin\psi \\ 0 & \sin\psi & \cos\psi \end{pmatrix}$$

For pixel (u,v) on the image, a 3D point (x,y,z) in focal plane corresponding to the pixel may be calculated as follows:

$$\begin{pmatrix} x \\ y \\ z \end{pmatrix} = K^{-1} \begin{pmatrix} u \\ v \\ 1 \end{pmatrix}$$

The 3D point may further be rotated according to rotation matrix:

$$\begin{pmatrix} x' \\ y' \\ z' \end{pmatrix} = R \begin{pmatrix} x \\ y \\ z \end{pmatrix}$$

The rotated 3D point may be projected onto the image plane according to the following which may be used to more accurately determine a distance between a movable object and an obstacle:

$$\begin{pmatrix} u' \\ v' \\ 1 \end{pmatrix} = K \begin{pmatrix} x' \\ y' \\ z' \end{pmatrix} = KRK^{-1} \begin{pmatrix} u \\ v \\ 1 \end{pmatrix}$$

Figure 9:
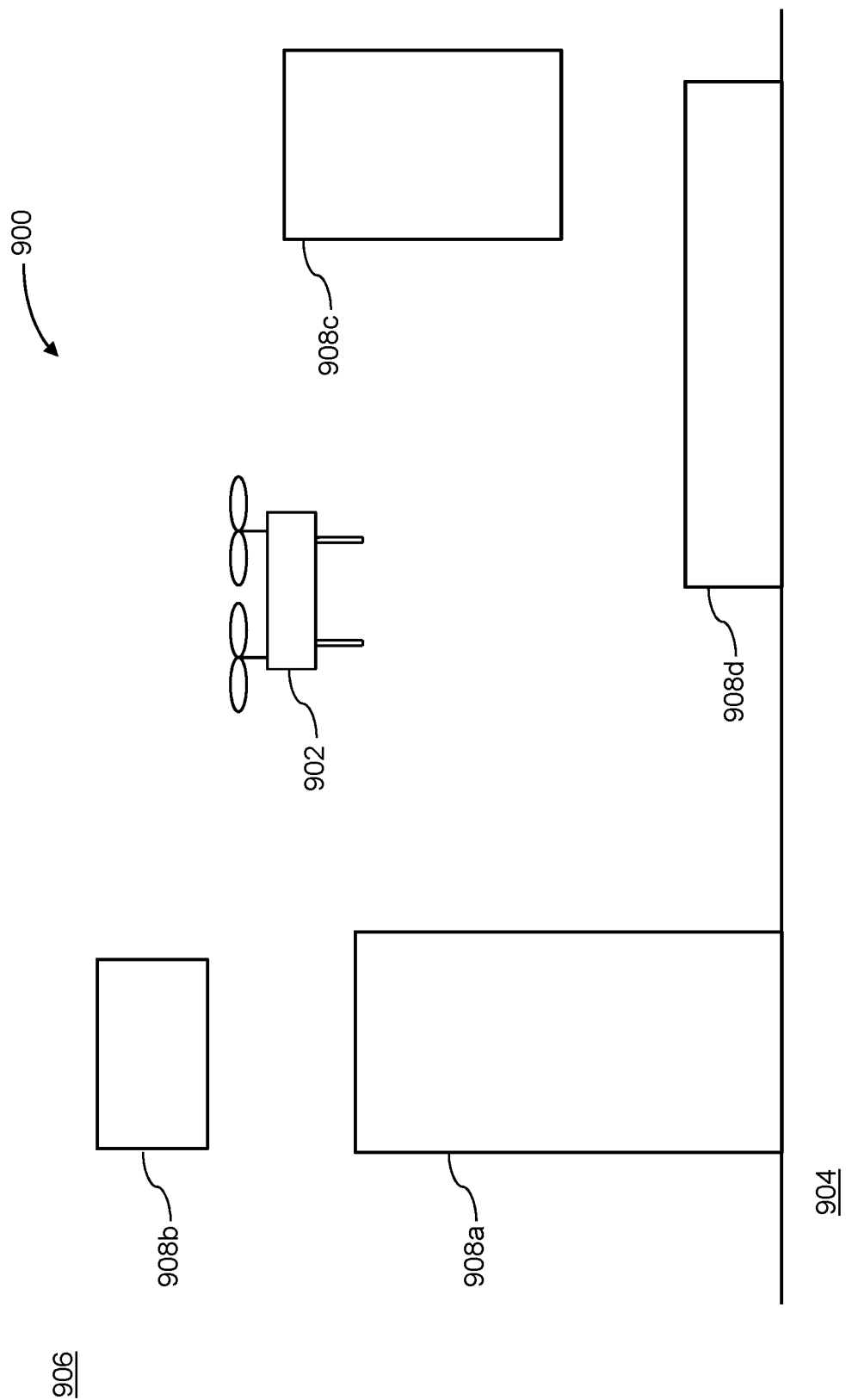
FIG. 9 illustrates a UAV operating in an outdoor environment in accordance with embodiments.

FIG. 9 illustrates a UAV 902 operating in an outdoor environment 900, in accordance with embodiments. The outdoor environment 900 may be an urban, suburban, or rural setting, or any other environment that is not at least partially within a building. The UAV 902 may be operated relatively close to the ground 904 (e.g., low altitude) or relatively far from the ground 904 (e.g., high altitude). For example, a UAV 902 operating less than or equal to approximately 10 m from the ground may be considered to be at low altitude, while a UAV 902 operating at greater than or equal to approximately 10 m from the ground may be considered to be at high altitude.

In some embodiments, the outdoor environment 900 includes one or more obstacles 908a-d. An obstacle may include any object or entity that may obstruct the movement of the UAV 902. Some obstacles may be situated on the ground 904 (e.g., obstacles 908a, 908d), such as buildings, ground vehicles (e.g., cars, motorcycles, trucks, bicycles), human beings, animals, plants (e.g., trees, bushes), and other manmade or natural structures. Some obstacles may be in contact with and/or supported by the ground 904, water, manmade structures, or natural structures. Alternatively, some obstacles may be wholly located in the air 906 (e.g., obstacles 908b, 908c), including aerial vehicles (e.g., airplanes, helicopters, hot air balloons, other UAVs) or birds. Aerial obstacles may not be supported by the ground 904, or by water, or by any natural or manmade structures. An obstacle located on the ground 904 may include portions that extend substantially into the air 906 (e.g., tall structures such as towers, skyscrapers, lamp posts, radio towers, power lines, trees, etc.). A UAV operating in an outdoor environment may capture images of said obstacles. For example, an imaging device oriented vertically relative to the UAV as described herein may capture images of the obstacles. The captured images may be processed by a processor to be used in obstacle detection and avoidance, navigation, and/or state determination of the UAV.

Figure 10:
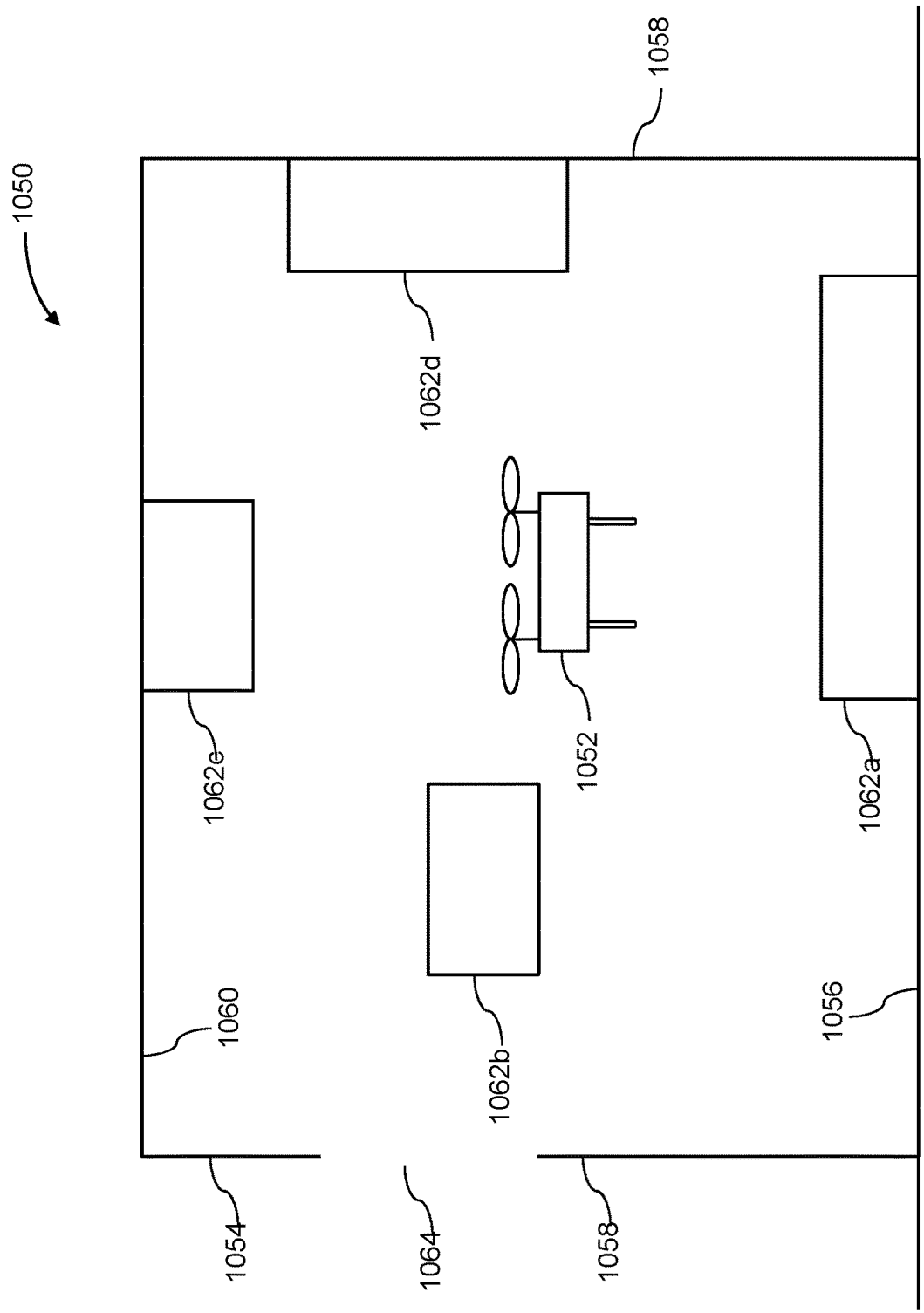
FIG. 10 illustrates a UAV operating in an indoor environment in accordance with embodiments.

FIG. 10 illustrates a UAV 1052 operating in an indoor environment 1050, in accordance with embodiments. The indoor environment 1050 is within the interior of a building 1054 having a floor 1056, one or more walls 1058, and/or a ceiling or roof 1060. Exemplary buildings include residential, commercial, or industrial buildings such as houses, apartments, offices, manufacturing facilities, storage facilities, and so on. The interior of the building 1054 may be completely enclosed by the floor 1056, walls 1058, and ceiling 1060 such that the UAV 1052 is constrained to the interior space. Conversely, at least one of the floor 1056, walls 1058, or ceiling 1060 may be absent, thereby enabling the UAV 1052 to fly from inside to outside, or vice-versa. Alternatively or in combination, one or more apertures 1064 may be formed in the floor 1056, walls 1058, or ceiling 1060 (e.g., a door, window, skylight).

Similar to the outdoor environment 1000, the indoor environment 1050 can include one or more obstacles 1062a-d. Some obstacles may be situated on the floor 1056 (e.g., obstacle 1062a), such as furniture, appliances, human beings, animals, plants, and other manmade or natural objects. Conversely, some obstacles may be located in the air (e.g., obstacle 1062b), such as birds or other UAVs. Some obstacles in the indoor environment 1050 can be supported by other structures or objects. Obstacles may also be attached to the ceiling 1060 (e.g., obstacle 1062c), such as light fixtures, ceiling fans, beams, or other ceiling-mounted appliances or structures. In some embodiments, obstacles may be attached to the walls 1058 (e.g., obstacle 1062d), such as light fixtures, shelves, cabinets, and other wall-mounted appliances or structures. Notably, the structural components of the building 1054 can also be considered to be obstacles, including the floor 1056, walls 1058, and ceiling 1060. A UAV operating in an outdoor environment may capture images of said obstacles. For example, an imaging device oriented vertically relative to the UAV as described herein may capture images of the obstacles. The captured images may be processed by a processor to be used in obstacle detection and avoidance, navigation, and/or state determination of the UAV.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner.

The embodiments provided herein can be applied to various types of UAVs. For instance, the UAV may be a small-scale UAV that weighs no more than 10 kg and/or has a maximum dimension of no more than 1.5 m. In some embodiments, the UAV may be a rotorcraft, such as a multi-rotor aircraft that is propelled to move through the air by a plurality of propellers (e.g., a quadcopter). Additional examples of UAVs and other movable objects suitable for use with the embodiments presented herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., an airport) and not fly within a predetermined distance of the restricted flight region, thereby averting potential collisions with aircraft and other obstacles.

The systems, devices, and methods described herein can be applied to a wide variety of movable objects. As previously mentioned, any description herein of a UAV may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3. Conversely, the total volume of the movable object may be greater than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3.

In some embodiments, the movable object may have a footprint (which may refer to the lateral cross-sectional area encompassed by the movable object) less than or equal to about: 32,000 cm2, 20,000 cm2, 10,000 cm2, 1,000 cm2, 500 cm2, 100 cm2, 50 cm2, 10 cm2, or 5 cm2. Conversely, the footprint may be greater than or equal to about: 32,000 cm2, 20,000 cm2, 10,000 cm2, 1,000 cm2, 500 cm2, 100 cm2, 50 cm2, 10 cm2, or 5 cm2.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 11:
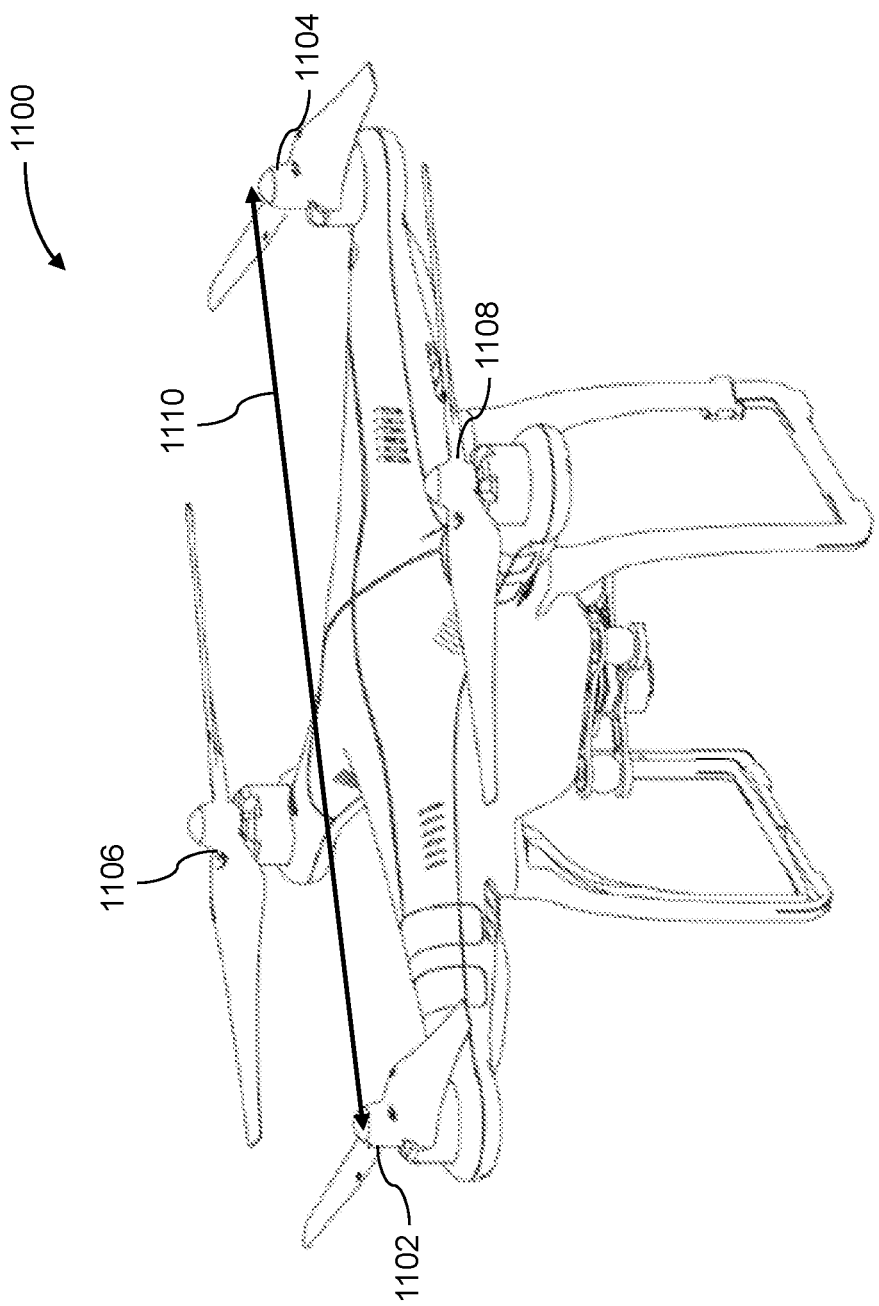
FIG. 11 illustrates an unmanned aerial vehicle (UAV), in accordance with embodiments.

FIG. 11 illustrates an unmanned aerial vehicle (UAV) 1100, in accordance with embodiments of the present disclosure. The UAV may be an example of a movable object as described herein. The UAV 1100 can include a propulsion system having four rotors 1102, 1104, 1106, and 1108. Any number of rotors may be provided (e.g., one, two, three, four, five, six, seven, eight, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1110. For example, the length 1110 can be less than or equal to 2 m, or less than equal to 5 m. In some embodiments, the length 1110 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
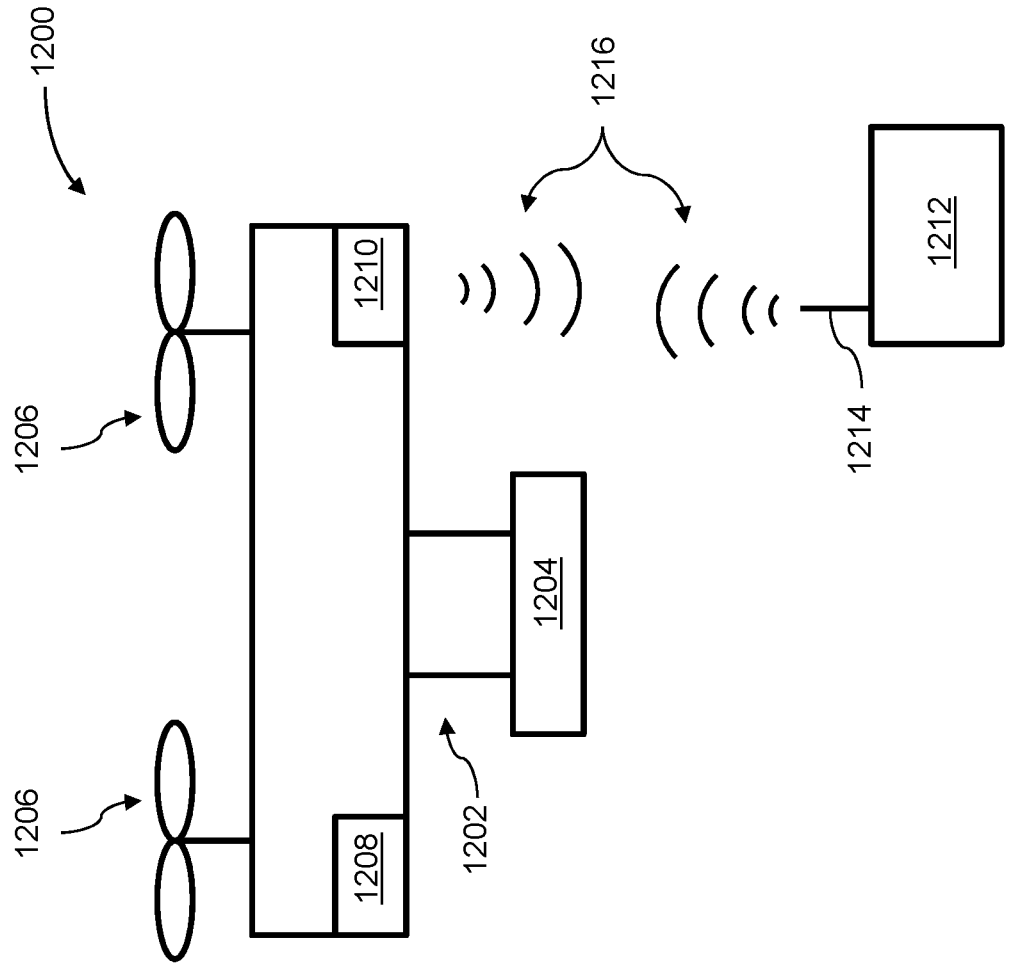
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. For example, the propulsion mechanisms 1206 may be rotor assemblies or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication, such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
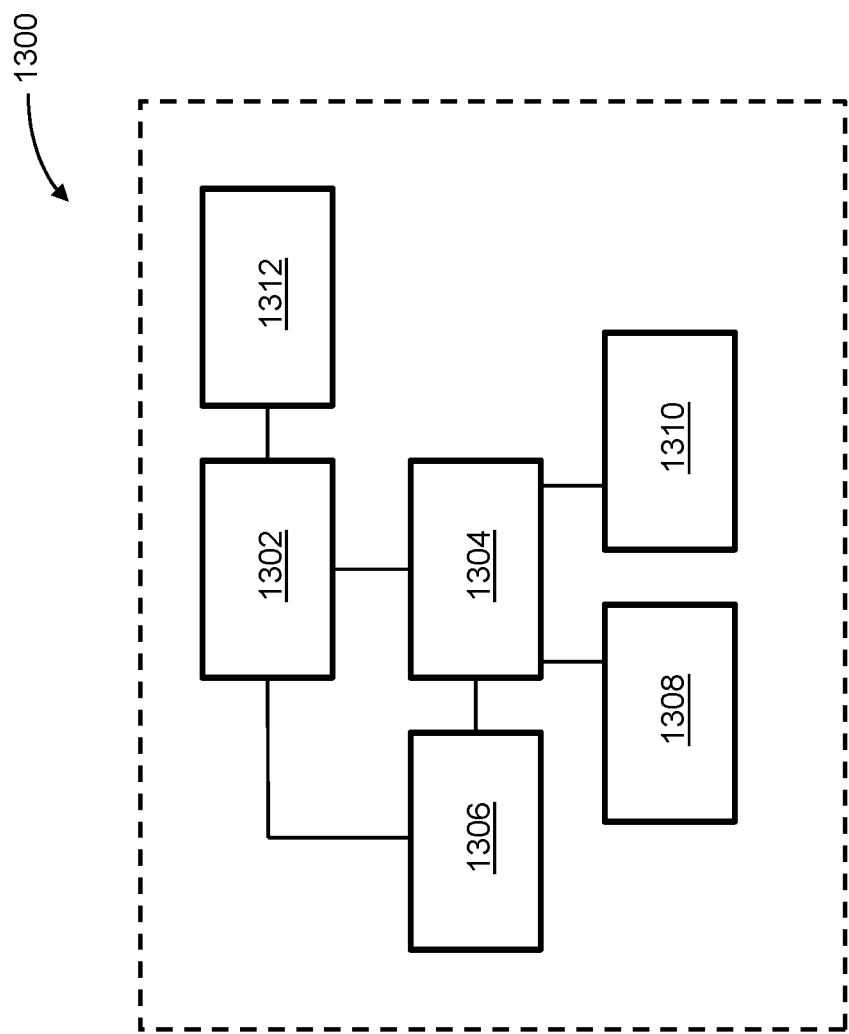
FIG. 13 is a schematic illustration by way of block diagram of a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable processor (e.g., a central processing unit (CPU)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. For example, the processing unit 1304 can be configured to execute instructions causing one or more processors of the processing unit 1304 to analyze sensing data produced by the sensing module. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

As used herein A and/or B encompasses one or more of A or B, and combinations thereof such as A and B.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method for using an imaging device carried by a movable object, the method comprising:
   receiving, at one or more processors, a plurality of images from the imaging device carried by the movable object;
   determining, with aid of the one or more processors according to sensing data received from one or more sensors of the movable object, whether an environment type of the movable object is a first type or a second type;
   identifying, with aid of the one or more processors, a target based on the plurality of images using a first method in response to determining that the environment type is the first type and using a second method different from the first method in response to determining that the environment type is the second type; and
   determining, with aid of the one or more processors, state information of the movable object or the target based on the plurality of images.

2. The method of claim 1, wherein the imaging device is configured to have a field of view oriented upward or downward relative to the movable object.

3. The method of claim 1, wherein the first type includes an outdoor environment and the first method includes distinguishing the target from a background using a color-based image segmentation algorithm.

4. The method of claim 3, wherein the color-based image segmentation algorithm includes a K-Means clustering algorithm.

5. The method of claim 1, wherein the second type includes an indoor environment and the second method includes distinguishing the target from a background using a corner detection algorithm.

6. The method of claim 1, wherein the plurality of images include a first image taken by the imaging device at a first location and a second image taken by the imaging device after the movable object traveled from the first location to a second location.

7. The method of claim 6, further comprising:
measuring, with aid of the one or more processors according to the sensing data received from the one or more sensors of the movable object, a distance between the first location and the second location.

8. The method of claim 7, wherein determining the state information of the movable object or the target includes:
determining, with aid of the one or more processors, the state information of the movable object or the target, based on the first image, the second image, and the distance between the first location and the second location.

9. The method of claim 1, wherein the state information of the movable object includes a velocity of the movable object.

10. The method of claim 1, wherein the state information includes details of the target.

11. The method of claim 10, further comprising calculating a distance between the movable object and the target by segmenting the plurality of images.

12. The method of claim 11, wherein the target is positioned at a side of the movable object, and the distance between the movable object and the target is calculated based on an angle of view of the target within the plurality of images.

13. The method of claim 11, wherein calculating the distance includes:
detecting feature points in the plurality of images; and
determining changes in the feature points between the plurality of images.

14. The method of claim 11, wherein segmenting the plurality of images include segmenting the plurality of images by one of a threshold method, a color-based segmentation method, a transform method, and a texture method.

15. The method of claim 1, wherein the imaging device is coupled to the movable object via a coupling that permits rotational movement of the imaging device relative to the movable object.

16. The method of claim 15, wherein the rotational movement of the imaging device is controlled remotely by user input.

17. The method of claim 15, wherein the rotational movement of the imaging device is controlled autonomously.

18. The method of claim 1, wherein the movable object is an unmanned aerial vehicle (UAV).

19. A system for detecting targets using a movable object, the system comprising:
an imaging device carried by the movable object, the imaging device being configured to obtain a plurality of images;
one or more sensors configured to obtain sensing data; and
one or more processors individually or collectively configured to:
receive the plurality of images from the imaging device;
determine, according to the sensing data received from the one or more sensors, whether an environment type of the movable object is a first type or a second type;
identify a target based on the plurality of images using a first method in response to determining that the environment type is the first type and using a second method different from the first method in response to determining that the environment type is the second type; and
determine state information of the movable object based on the plurality of images.

20. A method for navigation of a movable object, the method comprising:
receiving an image from an imaging device carried by the movable object;
receiving attitude information of the movable object;
determining, with aid of one or more processors according to sensing data received from one or more sensors of the movable object, whether an environment type of the movable object is a first type or a second type;
identifying, with aid of the one or more processors, a target based on the image using a first method in response to determining that the environment type is the first type and using a second method different from the first method in response to determining that the environment type is the second type; and
determining, with aid of the one or more processors, state information of the movable object based on the image and the attitude information.

* * * * *